United States Patent [19]

Victorov et al.

[11] Patent Number: 5,945,136
[45] Date of Patent: Aug. 31, 1999

[54] HEATING ELEVATOR FOR CAPSULE MAKING MACHINE

[75] Inventors: Herman Victorov; Ioan Dumitru Balc, both of Windsor, Canada

[73] Assignee: Technophar Equipment & Service Limited, Tecumseh, Canada

[21] Appl. No.: 08/834,810

[22] Filed: Apr. 3, 1997

[51] Int. Cl.[6] ............................ B29C 41/44; B29C 41/46
[52] U.S. Cl. ................. 425/270; 425/804; 425/DIG. 39
[58] Field of Search .................................. 425/269, 270, 425/804, DIG. 39

[56] References Cited

U.S. PATENT DOCUMENTS

| | | | |
|---|---|---|---|
| 961,936 | 6/1910 | Colton et al. | 425/96 |
| 1,114,325 | 10/1914 | Winchester | 425/231 |
| 1,146,539 | 7/1915 | Winchester | 425/231 |
| 1,787,777 | 1/1931 | Colton | 425/96 |
| 1,978,829 | 10/1934 | Wilkie | 264/303 |
| 2,671,245 | 3/1954 | Kath | 29/38.9 |
| 2,975,477 | 3/1961 | Hostetler | 425/270 |
| 3,399,803 | 9/1968 | Oglevee et al. | 220/780 |
| 3,614,812 | 10/1971 | Ayres et al. | 425/376.1 |
| 3,617,588 | 11/1971 | Langman | 264/301 |
| 3,632,700 | 1/1972 | Oglevee | 264/40.4 |
| 3,794,453 | 2/1974 | Padilla et al. | 425/270 |
| 3,794,493 | 2/1974 | Sobel et al. | 252/589 |
| 3,802,272 | 4/1974 | Bischoff et al. | 73/866 |
| 3,842,242 | 10/1974 | Chisholm | 425/96 |
| 4,001,211 | 1/1977 | Sarkar | 264/301 |
| 4,026,986 | 5/1977 | Christen et al. | 264/301 |
| 4,061,859 | 12/1977 | Cheng | 536/88 |
| 4,196,564 | 4/1980 | Bodenmann et al. | 53/471 |
| 4,196,565 | 4/1980 | Bodenmann et al. | 53/471 |
| 4,247,006 | 1/1981 | Bodenmann et al. | 425/275 |
| 4,250,997 | 2/1981 | Bodenmann et al. | 206/528 |
| 4,268,265 | 5/1981 | Von Wattenwyl | 8/438 |
| 4,576,284 | 3/1986 | Wittwer et al. | 206/530 |
| 4,591,475 | 5/1986 | Tomka et al. | 264/328.14 |
| 4,627,808 | 12/1986 | Hughes | 425/270 |
| 4,636,165 | 1/1987 | Roast | 425/274 |
| 4,758,149 | 7/1988 | Sauter | 425/275 |
| 4,997,359 | 3/1991 | Lebrun | 425/269 |
| 5,032,074 | 7/1991 | Muto et al. | 425/272 |
| 5,112,559 | 5/1992 | Lebrun | 264/301 |
| 5,271,881 | 12/1993 | Redding, Jr. | 425/5 |
| 5,427,614 | 6/1995 | Wittwer et al. | 106/213 |
| 5,698,155 | 12/1997 | Grosswald et al. | 425/272 |
| 5,750,157 | 5/1998 | Grosswald et al. | 425/270 |
| 5,756,036 | 5/1998 | Grosswald et al. | 425/270 |

FOREIGN PATENT DOCUMENTS

| | | |
|---|---|---|
| 1151823 | 8/1983 | Canada . |
| 056825 | 8/1982 | European Pat. Off. . |
| 672275 | 12/1929 | France . |
| 693174 | 11/1930 | France . |
| 2339059 | 2/1974 | Germany ............... 425/270 |
| 2722805 | 11/1978 | Germany . |
| 2025270 | 1/1980 | United Kingdom . |
| 2214516 | 9/1989 | United Kingdom . |
| WO 92/21311 | 12/1992 | WIPO . |

OTHER PUBLICATIONS

Technophar Equipment and Service Limited Brochure, prior to Apr. 3, 1997, entire document.

Technophar Publication including background and overview information on the capsule manufacturing process, prior to Apr. 3, 1997, entire document (25 pages).

Technophar Equipment & Service Ltd. Drawing of "Hard Gelatin Capsule Machine", General Assembly, Model No. Two–Deck–Tes/E, Drawing No. 03140, offered for sale prior to Apr. 1997.

*Primary Examiner*—Robert Davis
*Attorney, Agent, or Firm*—Harness, Dickey & Pierce, P.L.C.

[57] ABSTRACT

A capsule-making system for the manufacture of capsules for pharmaceutical use includes an elevator for manipulating and uniformly heating a plurality of vertically stacked pin bars prior to dipping. The heated elevator station is positioned before the dipping station as part of the capsule-making machine. The elevator comprises a series of vertically stacked pin bars. A series of oil lines carrying hot oil is provided is within the elevator such that each of the pin bars is evenly heated. More than one elevator (i.e., more than one pin bar stack) may be situated in a side-by-side manner. Each elevator stack is selectively moved up or down by means of one or more hydraulic cylinders.

54 Claims, 18 Drawing Sheets

HEATING ELEVATOR FOR CAPSULE MAKING MACHINE

BACKGROUND AND SUMMARY OF THE INVENTION

This invention relates generally to the manufacture of capsules used to contain medications. More particularly, the present invention relates to a capsule-making machine which incorporates a heating elevator.

Capsules used for the oral administration of pharmaceutical drugs are composed of soluble shells. The shells, which are provided in both "hard" and "soft" forms, are typically composed of gelatin, which is a thermo-gelling material. Gelatin is a tasteless and colorless mixture of derived proteins of the albuminous class which is ordinarily soluble in warm water. Two types of gelatin—Type A and Type B—are commonly used. Type A gelatin is a derivative of acid-treated raw materials. Type B gelatin is a derivative of alkali-treated raw materials.

Capsule shells comprise a cap and a body. The cap partly overlaps the body when the two are attached to form the capsule. A closed container is thereby formed within the capsule for disposition of one or more pharmaceutical drugs.

At present, the manufacture of capsules includes the general steps of gelatin mixing, gelatin warming, formation of the cap and body on pins, the drying of the cap and body, removal of the dried cap and body from the pins, and assembly of the cap and body to form a capsule.

According to the first step, that of gelatin mixing, the gelatin provided in a mixing tank where it is mixed with hot deionized water to melt the gelatin and to bring it to the consistency necessary for capsule formation. Following gelatin warming, the mixed gelatin-water composition is warmed in a transfer tank for the step of gelatin warming.

The mixed and warmed gelatin composition is flowed into a dipping pan. The dipping pan is associated with an apparatus for forming the cap and body. As part of this apparatus, a series of "pin bars" having a series of round-ended and gradually tapered pins extending therefrom is movably provided. The pins are typically composed of stainless steel. Some of the pins are sized so as to form the body portion of the capsule, while a like number of others of the pins are sized so as to form the cap portion of the capsule. It is on the pins of the pin bar that the caps and bodies are formed. The pin bars move, track-like, on the typical capsule-making apparatus from station to station.

One of these stations is provided for pin-dipping. At this station, a number of pin bars are simultaneously caused to be inverted such that the pins of the pin bars are facing downward. The pin bars are then lowered so that the pins are partially immersed into the gelatin. Once immersion is completed, the pin bars are (again simultaneously) elevated and rotated such that the pins are now facing upward.

Following dipping, the partially-coated pin bars are then advanced to a drying station where the gelatin coating is dried by a variety of methods, including kiln drying.

The pin bars having the dried gelatin coating are then advanced to a trimming and removal station. At this point the excess dried gelatin is removed by trimming from each of the caps and bodies and each of these components is then removed from its respective pin. The formed and trimmed caps and bodies are either assembled at an assembly station or are packaged, unassembled, for delivery to the consuming pharmaceutical company.

The development of capsule-making machines goes back at least as early as the 1920's, as evidenced by U.S. Pat. No. 1,787,777, issued on Jan. 6, 1931, to Colton for CAPSULE MACHINE, incorporated by reference herein. This patent teaches the "Colton Machine" which established the standard for the industry.

Additional examples of manufacturing systems for the production of hard capsules for pharmaceutical use are disclosed in U.S. Pat. No. 5,032,074, issued on Jul. 16, 1991, to Muto et al. for APPARATUS FOR MANUFACTURING HARD CAPSULES FOR MEDICAMENT USE and U.S. Pat. No. 5,271,881, issued Dec. 21, 1993, to Redding, Jr., for APPARATUS AND METHOD FOR MAKING MICROCAPSULES. Specific aspects of certain procedures involved in the manufacture of capsules are disclosed in U.S. Pat. No. 4,627,808, issued on Dec. 9, 1986, to Hughes for APPARATUS FOR MAKING CAPSULE HAVING PLURAL CHAMBERS, U.S. Pat. No. 4,636,165, issued on Jan. 13, 1987, to Roast for STRIPPER RINGS FOR CAPSULE PINS, and U.S. Pat. No. 3,842,242, issued on Oct. 15, 1974, to Chisolm for APPARATUS FOR HEATING CAPSULE FORMING PINS. The disclosure of each of the aforementioned references is incorporated by reference herewithin. World Intellectual Property Organization International Publication No. WO 92/21311 for METHOD AND APPARATUS FOR THE MANUFACTURE OF PHARMACEUTICAL CELLULOSE CAPSULES and Canadian Patent No. 1,151,823 for HARD SHELL GELATIN CAPSULE DIPPING APPARATUS AND METHOD show other conventional machines.

The drawback to gelatin capsules is that unmodified gelatin is strongly hydrophilic and is soluble in water. Because of these characteristics, there is a tendency for the gelatin of the capsule to interact with the contained drug. Furthermore, these characteristics represent disadvantages in the handling and storage of gelatin-based capsules.

Recognizing the problems with gelatin-based capsules, efforts have been made to use cellulose as the base for capsule compositions. Specifically, methyl- and ethylcellulose having either alkyl or hydroxyalkyl group substitutions have been used.

While overcoming some of the inherent problems of gelatin-based capsules, cellulose-based capsules present a difficult manufacturing problem. Unlike gelatin-based capsules where the pin bars require no preheating, experience has shown that fluid cellulose-based coatings will flow too freely on an unheated pin. Accordingly, the pin bars must be heated to a point well-above the temperature of ambient air and preferably to approximately 120 degrees Centigrade. This level of heating will assure that the bars are still between 90 and 100 degrees Centigrade by the time the pins are actually dipped into the coating, thus minimizing the flow of the fluid cellulose. This is also necessary in order to provide for the cellulose coating to be properly and uniformly applied.

According to known technology and as mentioned above, a number of pin bars (typically on the order of five) are dipped at one time. Prior to dipping, the pin bars are lined up end-to-end in a heater. As the pin bars are heated, they are delivered to a dipping rack so that a group of pin bars (such as five) may be dipped simultaneously.

As is known, 25 bars per minute are passed through the pin bar heater. In the heater, the pin bars are individually elevated to the requisite temperature at a relatively constant rate of between approximately 2.3 and 2.5 seconds per bar. A run of five bars for the dipping group generates a time gap of between approximately 10.0 and 12.0 seconds between the first bar and the fifth bar.

The problem with the present method of manufacturing pharmaceutical capsules is that it is difficult, perhaps impossible, to maintain all of the bars of the dipping group at a uniform temperature during the critical times of the dipping cycle. Because of the great amount of time necessary to pass the pin bars single-file through the heater, temperature variation between the group of bars to be dipped is between 30 and 60 degrees Centigrade, with the first pin bar out of the heater being considerably cooler than the last pin bar out of the heater. Because it is the temperature of the pin bars which determines the amount of cellulose that will form on the pins (i.e., the warmer the pin bar, the thinner the coating), the present technology limits the production of high-quality cellulose-based capsules having consistent wall thicknesses.

An additional problem with the present method of manufacturing pharmaceutical capsules is one of cap and body removal. Today, it is known to additionally heat the pin bars after kiln drying to allow for easy removal of the cap and body. This is troublesome, as this heating step subjects the material of the capsule to an integrity-damaging procedure which may lead to products of lesser quality than deemed acceptable.

In accordance with the present invention, a preferred embodiment of the capsule-making system is a capsule-making machine which incorporates an elevator at the pre-dipping stage which provides for simultaneous heating of a plurality of pin bars and which allows for their quick movement following heating. The heated elevator station is positioned before the dipping station as part of the capsule-making machine.

In another aspect of the present invention, the elevator comprises a series of vertically stacked braces formed as part of a pin bar rack for receiving and temporarily holding pin bars. In a further aspect of the present invention, a series of hot fluid lines carrying hot fluid such as oil or water are formed within the elevator such that each of the pin bars is evenly heated through radiated heat. In addition, still another aspect of the present invention provides a heater shroud attached to the outer side of the vertical stacks to direct heat to the pin bars from the outside in a controlled manner.

In yet another aspect of the present invention, more than one elevator (i.e., more than one pin bar stack) may be situated in a side-by-side manner. Each elevator preferably accepts twelve stacked pin bars, although a greater or lesser number might be used. An additional aspect of the present invention allows the stack to be selectively moved up or down by means of an arrangement of hydraulic cylinders, the movement of which is managed by a computer. Each cylinder of the multi-cylinder arrangement has a different maximum extension value. By selectively operating each cylinder either at its maximum withdrawn or maximum extended state and by combining cylinder movements, inaccurate movement of the rack is eliminated.

Having the pin bar elevator incorporated therein, the system of the present invention is advantageous over traditional systems for forming pharmaceutical capsules. For example, because the elevator incorporates a single vertical row of pin bars, the internal temperature of the heater unit holding the bars is easier to maintain at a constant level. Furthermore, because each of the pin bars is heated substantially simultaneously, the only time any cooling is allowed to take place is during elevation of the pin bar rack between positions and the ejection of the individual pin bars. The result of this high speed operation is a temperature variation from pin bar to pin bar of only ±3 degrees C. An additional advantage of the present invention is that existing capsule making machines (such as the Colton machine or its many variations) may be easily retrofitted to include the pin bar elevator described herein.

Additional advantages and features of the present invention will become apparent from the following description and appended claims, taken in conjunction with the accompany drawings.

BRIEF DESCRIPTION OF THE DRAWINGS

FIG. 1b is the second portion of the preferred embodiment of the capsule-making system of the present invention set forth in FIG. 1a;

DETAILED DESCRIPTION OF THE PREFERRED EMBODIMENTS

The drawings disclose the preferred embodiments of the present invention. While the configurations according to the illustrated embodiments are preferred, it is envisioned that alternate configurations of the present invention may be adopted without deviating from the invention as portrayed. The preferred embodiments are discussed hereafter.

Figure 1A:
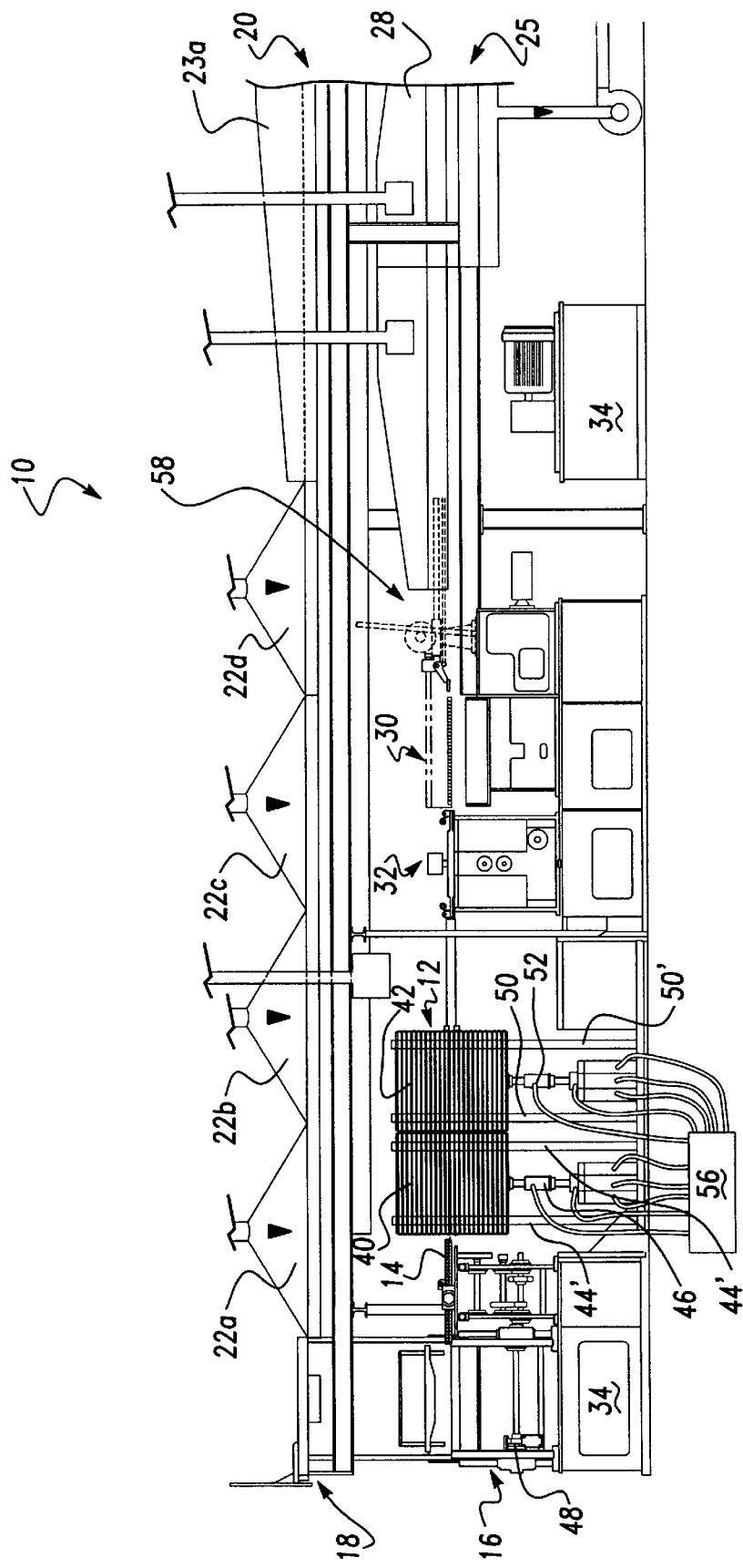
FIG. 1a is a side elevational view of the first portion of a preferred embodiment of the capsule-making system according to the present invention showing a pair of side-by-side elevator assemblies.
Figure 1B:
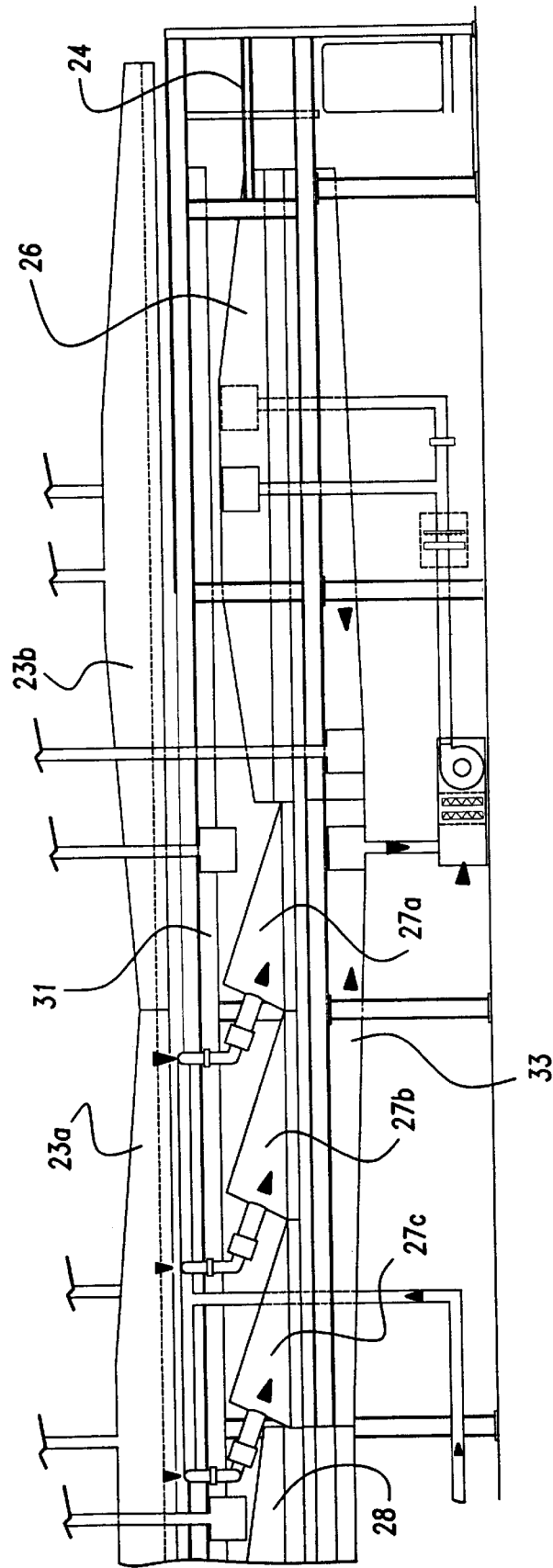

The manufacture of capsules according to the present invention is a multi-stepped process that includes a series of successive phases, from receipt of the raw materials to the shipment of the finished goods. FIGS. 1a and 1b illustrate the principal components of the capsule producing steps. Particularly, FIGS. 1a and 1b illustrate a side elevational view of a preferred embodiment of the capsule-making system according to the present invention. The system, generally illustrated as 10, includes an elevator assembly 12, a lubricator 14, dipper assembly 16, a front elevator 18, an upper deck, generally illustrated as 20, a first upper radiant heater defined by a series of radiant heating units 22a, 22b, 22c, and 22d, a second upper radiant heater defined by a pair of radiant heating units 23a and 23b, a rear elevator 24, a lower deck, generally illustrated as 25, a first lower radiant heater defined by a radiant heating unit 26, a second lower radiant heater defined by a series of radiant heating units 27a, 27b, and 27c, a third radiant heater defined by a radiant heating unit 28, a table section 30, an automatics assembly 32, and a hydraulic unit 35. These elements operate in concert to produce empty capsule assemblies capable of receiving pharmaceutical drugs.

The radiant heater units 22a, 22b, 22c, 22d, 23a, 23b, 26, 27a, 27b, 27c, and 28 are provided to apply the appropriate heat to kiln-dry the capsules portions formed on the pin bars. The units typically operate using a controlled flow of air heated to a desired temperature to kiln-dry the capsule portions formed on the pins of the pin bars. Heated air is delivered to the upper radiant heater units 22a, 22b, 22c, 22d, 23a, and 23b through a series of air feed lines and is withdrawn by means of an upper return plenum 31 and its associated exhaust line. Heated air is also delivered to the lower radiant heater units 26, 27a, 27b, 27c, and 28 through a series of feed air feed lines and is withdrawn by means of a lower return plenum 33 and its associated exhaust line. The air temperature of the air associated with the heater units is thermostatically controlled together with humidity and pressure.

The lubricator 14 includes a series of lubricating shells (not shown), equal in number to the pins on the applicable pin bar. Each shell includes a cavity that is lined with felt pads. The pads are soaked with a pharmaceutically neutral lubricant such as mineral oil. To accomplish lubrication, the shells are placed over their respective pins and are rotated to provide a lubricating coating so as to allow for the expeditious removal of the formed bodies and caps. The felt pads of the lubricating shells uniformly spread the lubricant on each of the pins.

The initial step of capsule formation includes the receipt and inspection of raw materials, including the capsule-forming composition. Once selected, the composition is prepared as necessary to bring it to the recommended consistency for the molding process. The prepared composition is then transferred into a stainless steel receiving or holding tank (not shown).

From the receiving tank the coating composition is moved into a transfer tank. The transfer tank (also known as a feed tank [again not shown]) is typically composed of stainless steel and preferably has a large capacity, such as 70 liters. The transfer tank is water-jacketed and is heated to maintain the required range of composition temperature so as to provide desired flow characteristics. Appropriate coloring dyes are selectively added to the composition while in the transfer tank. Both the viscosity and temperature of the composition must be within relatively narrow specified limits to insure proper quality during the molding or forming sequence. The composition feed tank is kept under controlled temperatures for a few hours before being transferred to the manufacturing room.

The molten composition is delivered to a dipping tank 34 of the dipper assembly 16. A heater (not shown) in the dipping tank 34 maintains the appropriate temperature throughout the manufacturing operation. A continuous flow of a hot fluid such as water is supplied through the tank 34 by circulating pumps (not shown) provided in association with the heater.

As each capsule requires a body and a cap, two concurrently-operating assembly lines are positioned side-by-side such that a like number of bodies and caps are produced simultaneously. This is important, as the last step of the manufacture of the capsule is the assembly of the body and the cap. Accordingly, the capsule system 10 has separate dipping pans for the cap and the body of the capsule, with the pans being placed in a side-by-side arrangement. Automatic viscosity controls and a composition distribution system continuously monitor the flow and level of the capsule-forming composition in the dipping pans which insures precise capsule wall thickness.

Figure 3:
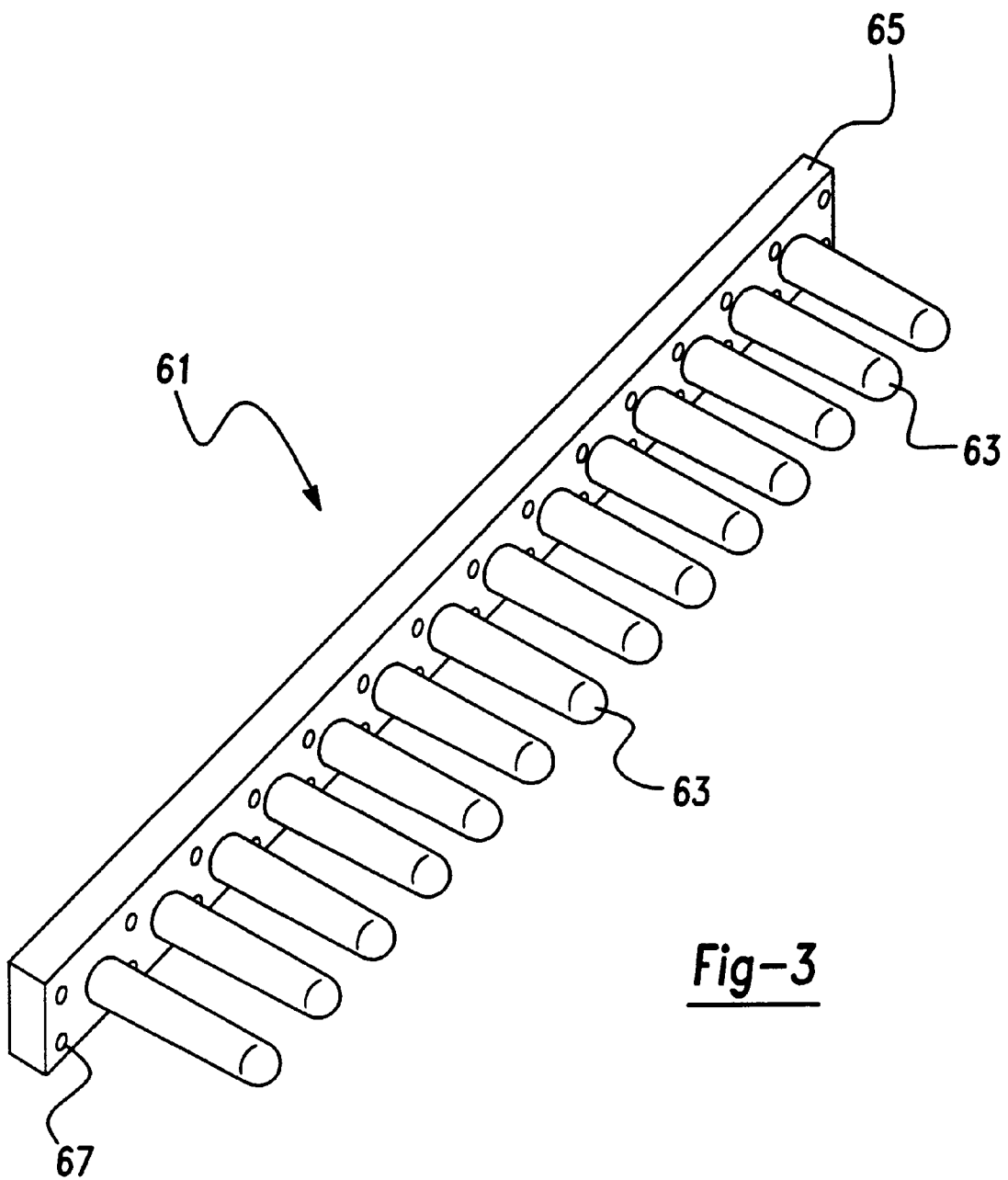
FIG. 3 is a perspective view of a pin bar according to the present invention.

The caps and bodies are formed on a plurality of stainless steel mold pins which are fixed on a pin bar. (A perspective view of an exemplary pin bar is illustrated in FIG. 3, discussed below.) While numbers may vary, typically there are 30 pins on a pin bar for capsules sizes 0, 1, 2, 3, 4, and 22 pins on a pin bar for capsules size 00.

In general, the system operates as follows. The empty pin bars are delivered to the racks of the pin bar racks 40 and 42, are heated, and are selectively driven out of the pin bar racks 40 and 42 by incoming pin bars through the lubricator 14 and to the dipper assembly 16 for dipping. The table section accumulates pin bars. A center bar pusher 58 included in the table section 30 provides the sliding movement to the pairs of pin bars being driven through the system 10. (The pin bars are manipulated in side-by-side pairs in accordance with the operation of the system 10 which is intended to the simultaneous formation of bodies and caps.)

Figure 2A:
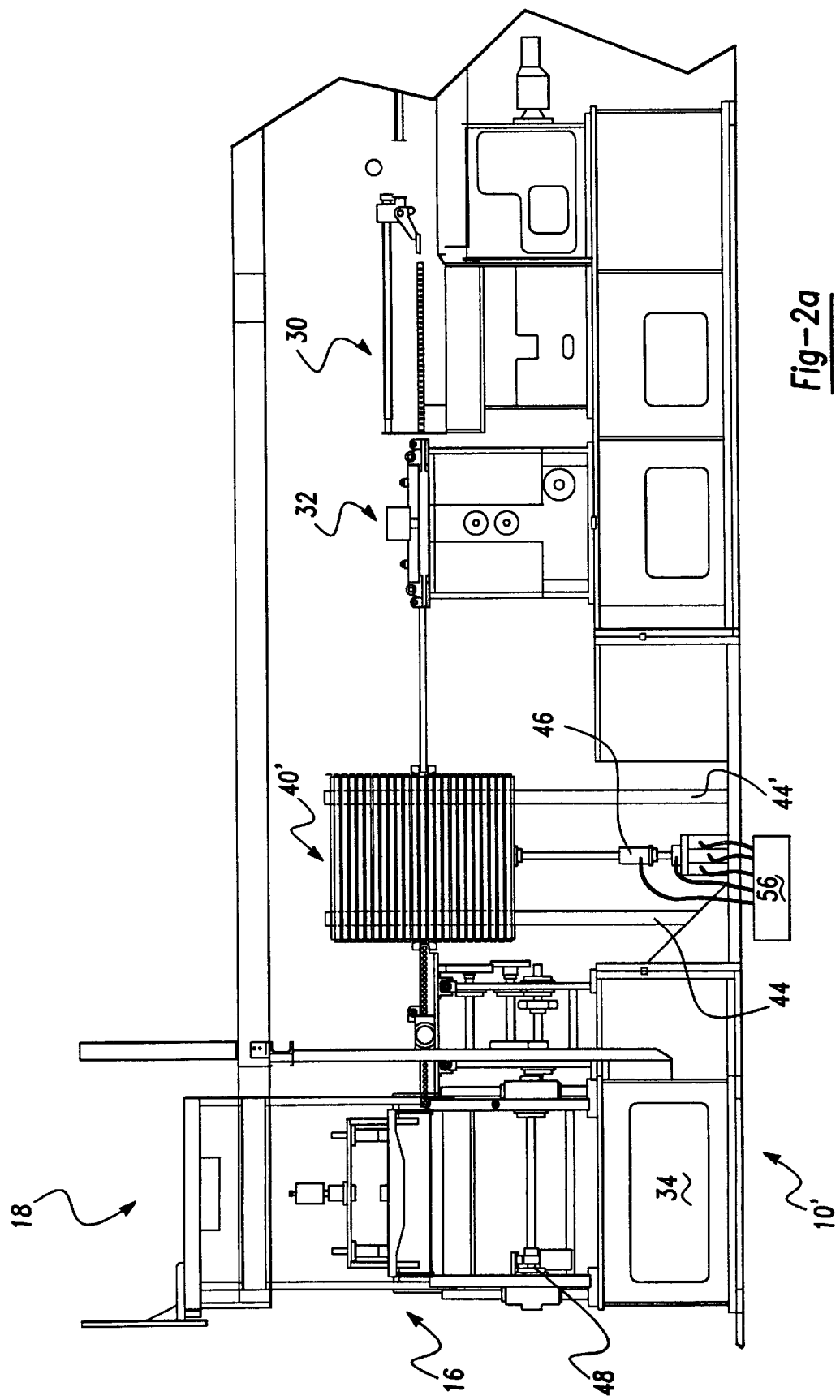
FIG. 2a is a partial side elevational view of an alternate embodiment of a capsule-making system according to the present invention showing a single elevator assembly.
Figure 2B:
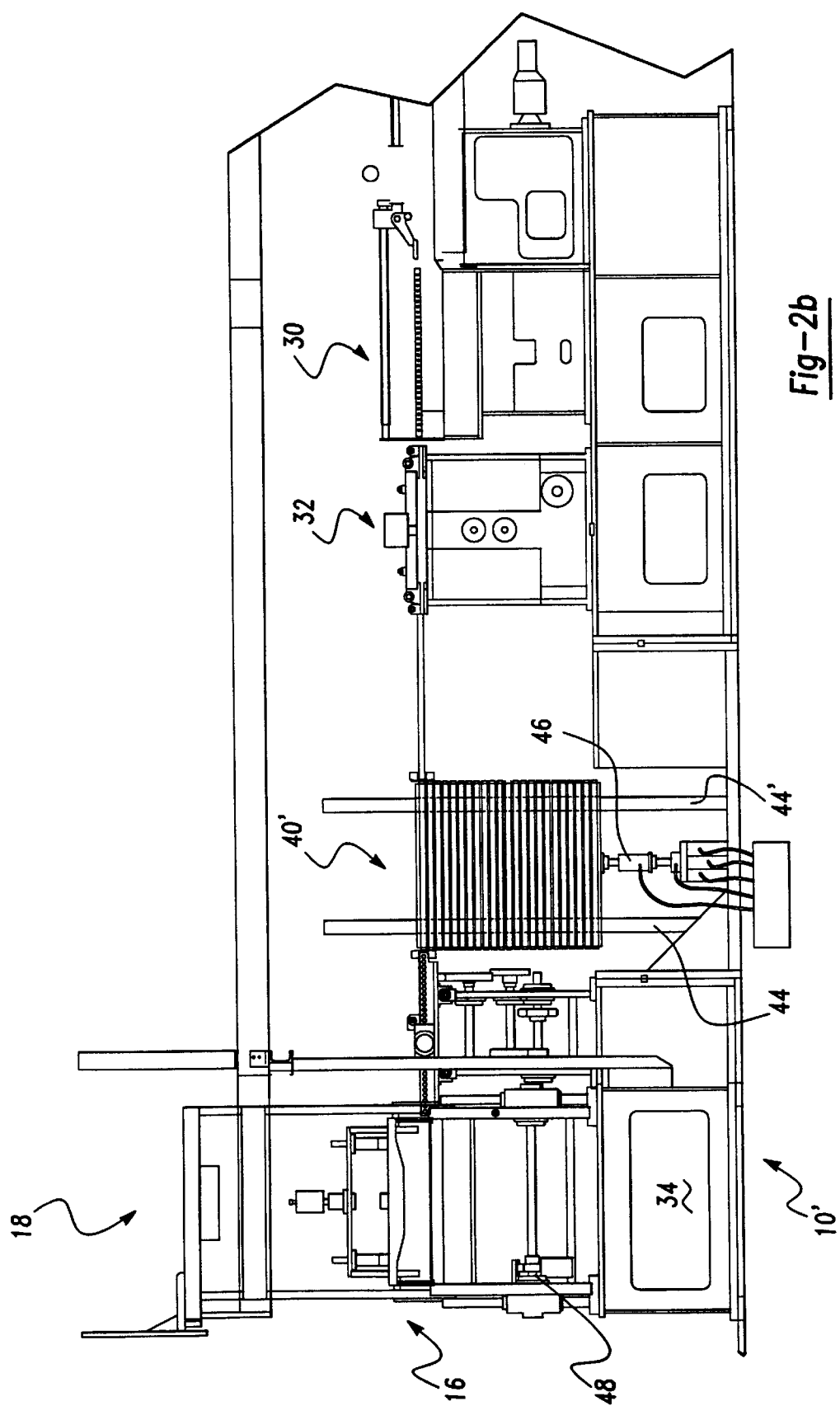
FIG. 2b is a view similar to that of FIG. 2a, but showing the elevator moved to its lowermost position.

In particular, empty pin bars are loaded onto the elevator assembly 12 of FIGS. 1a and 1b. The assembly 12 is shown in an exemplary arrangement and includes a first vertical pin bar rack 40 in association with a second vertical pin bar rack 42. Each of the pin bar racks 40 and 42 is associated with a heating system (discussed below with respect to FIG. 4) to bring the retained pin bars to a preselected temperature prior to lubrication and dipping. While two racks are illustrated, it must be understood that a single rack may be used, as illustrated in FIGS. 2a and 2b and as discussed in association therewith.

The pin bar rack 40 is movably associated with a pair of spaced apart slides 44, 44' and is operatively associated with a driver assembly 46. The pin bar rack 42 is movably associated with a pair of spaced apart slides 50, 50' and is operatively associated with a driver assembly 52. Each of the pin bar racks 40 and 42 is movably operable in the vertical direction to a selected position which allows the loading and unloading of the pin bars. The vertical position of the racks is adjusted in response to one or more position sensors (not shown) which read the linear position of incoming pin bar racks. A programmable controller or computer 56 is connected to each of the drivers 46 and 52 as well as the position sensors to selectively control movement of the driver assemblies 46 and 52 according to a preselected program. When the linear position of an incoming rack is determined, the computer 56 signals the drivers 46 and 52 to adjust the vertical positions of the racks 40 and 42 (preferably simultaneously) so as to allow the incoming pin bar to be pushed into a slot of the rack 42, thus forcing the pin bar in the rack 42 (which has been resident in the rack 42 the longest) out of its slot and into an adjacent slot of the rack 40. The pin bar which occupies this slot in rack 40 (which has been resident in the rack 40 the longest) is itself pushed to the lubricator 14 for lubrication. (The step of lubrication allows for easy release of the formed capsule portions following kiln drying.)

After the lubricant is applied, each of several pin bars is loaded into slots formed on opposed rotatable dipper rack 48 which is part of the dipper assembly 16. The groups of pin bars may be five, six, seven, or more. The loaded dipper rack 48 rotates so that the pins of each of the pin bars is pointed downward in the direction of the tank 34. The loaded dipper rack or spinner 48 is slowly lowered at a specific speed and to a precisely regulated depth to allow the coating of the pin bars by the coating composition to a preselected depth on the pins. The coated pin bars are withdrawn and are again rotated so that the pins are facing upward. The rotation of the pin bars on the rack 48 is again carefully regulated so as to assure uniform wall thickness of the capsule portions and to prevent excess accumulations of composition at the dome-shoulder of the capsules. The coated, upward-facing pin bars are elevated to the upper deck 20 via the front elevator 18 and are pushed from the rack 48 onto the deck 20. Thereafter, the pin bars are grouped, side-by-side, for horizontal movement along the upper deck 20, between the front elevator 18 and the rear elevator 24, passing between the radiant heater units 22a, 22b, 22c, 22d, 23a, and 23b and the upper return plenum 31 for drying. When the group of preliminarily dried pin bar racks reaches the rear elevator 24, the group is placed on the elevator 24 and is lowered to the lower deck 25, whereupon the group moves in a horizontal direction opposite that taken on the upper deck 20, passing between the lower heater units 26, 27a, 27b, 27c, and 28 and the lower return plenum 33 for final drying.

After drying, the coated pin bars are delivered to the automatics assembly 32 where the caps and bodies are stripped from the pins on which they have been formed, cut to the required length and assembled into empty capsules and removed from the machine. The empty pin bars, after the capsule halves have been stripped therefrom, are delivered to the elevator assembly 12 for reheating and selective delivery to the lubricator 14 in preparation for the next dipping operation.

The entire process of capsule manufacturing is completely automated to eliminate human intervention and the possible consequence of the spread of disease. The duration of a cycle is variable, depending on the machine speed.

Figure 1C:
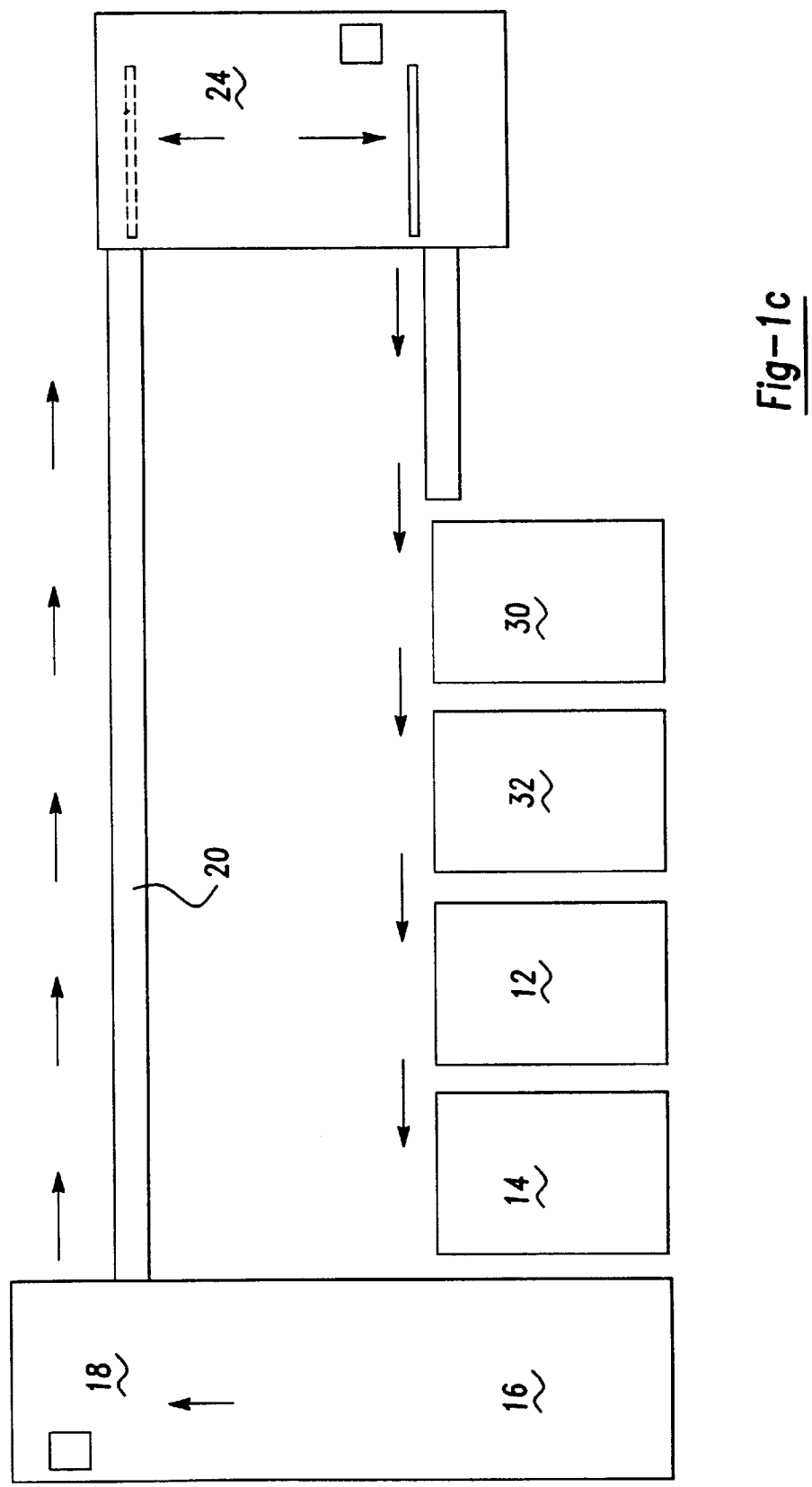
FIG. 1c is a general layout of the capsule-making machine according to the preferred embodiment of the present invention shown in FIGS. 1a and 1b.

FIG. 1c is a general layout of the capsule-making machine according to the preferred embodiment of the present invention shown in FIGS. 1a and 1b. It should be understood that alternate layouts of the system of the present invention may be adopted without deviating from the layout as portrayed. For example, it is possible that the upper deck may be situated along side the lower deck as opposed to being situated above the lower deck if height in the manufacturing facility is limited. Furthermore, and again by way of example, a greater number of heating radiant panels may be used.

FIG. 2a is a partial side elevational view of an alternate embodiment of a capsule-making system according to the present invention shown as 10' showing only a single pin bar rack 40'. According to this arrangement, the empty pin bars are delivered directly from the automatics assembly 32 to the pin bar rack of the assembly 40' for heating and selective positioning with respect to the lubricator 14. FIG. 2b is a view similar to that of FIG. 2, but showing the pin bar rack 40' lowered to receive an empty pin bar at its uppermost level. FIGS. 2a and 2b are useful in illustrating the various positions that may be achieved by the selective movement of the pin bar rack of the elevator assembly of the present invention.

The two-pieced, hard, empty capsules produced according to the system of the present invention rely on two preforms—one for the capsule body and the other for the capsule cap. A series of preforms or pins are provided for this purpose. FIG. 3 is a perspective view of a pin bar, generally illustrated as 61. The pin bar 61 includes a plurality of round-topped mold pins 63 fixedly mounted to a pin bar base 65. It is on the pins 63 of the pin bar 61 that the caps and bodies of the individual capsules are formed. The number of mold pins 63 may vary in number, but are frequently in the range of approximately 30 per pin bar. The outer diameters of the pins 63 are smaller for those forming the bodies than for those forming the caps.

According to the present invention, expedient and substantially complete heating of the pin bar 61 is determined to be ideal. Accordingly, the pin bar 61 of the present invention has a plurality of passageways 67 formed through the pin bar base 65 offset from the pins. This arrangement improves the heating of the pin bar 61 as it resides in the pin bar rack 40' and passes by the heater units of the upper and lower decks 20 and 25, respectively. The illustrated arrangement of the passageways is exemplary and is not intended to be limiting.

As mentioned, the pin bar racks may be selectively elevated to different heights. At the end of each vertical stroke, a single empty pin bar is loaded onto the rack. Each pin bar stays on the rack for approximately 34 seconds, and, using twelve pin bars as a suggested number, translates into the heating of 30 bars per minute. A pin bar pusher loads the empty bars and pushes the heated bars toward the dipper assembly 16.

Figure 4:
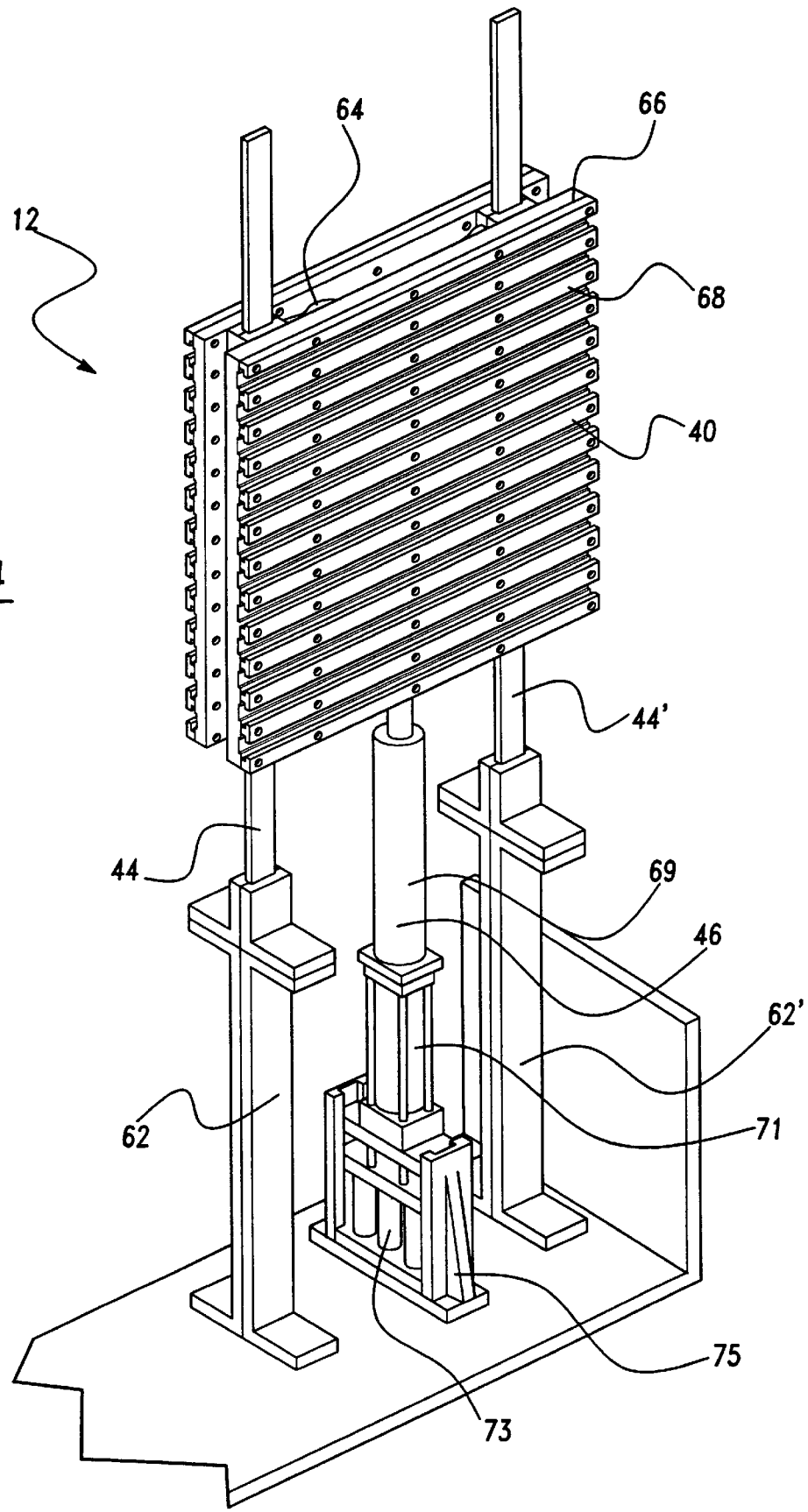
FIG. 4 is a perspective view of a single elevator assembly.

FIG. 4 is a perspective view of a single elevator assembly, generally illustrated as 12. The elevator assembly 12 includes the pin bar rack 40 operatively associated with the slides 44 and 44'. (A greater or lesser number of slides may be used other than that as shown.) The slide 44 is mounted in a slide base 62 and the slide 44' is mounted in a slide base 62'.

The driver 46 comprises a plurality of cylinders for selectively arranging the height of the rack 40. While a variety of arrangements may be used, the illustrated exemplary arrangement includes three such cylinders, with each cylinder having a different stroke length. According to the exemplary embodiment, a first cylinder 69 has a stroke of a first length, such as six inches, a second cylinder 71 has a stroke of a second length, such as three inches, and one or more third cylinders 73 have a stroke of a third length, such as one inch. This arrangement allows for significant accuracy in the placement of the rack 40. Based on a variety of combinations, the rack can achieve a variety of vertical positions. For example, with each of the cylinders 69, 71, and 73 in their retracted positions, a first vertical height is achieved. With one of the cylinders 69 extended and the other cylinders 71 and 73 retracted, a second vertical height is achieved. With one of the cylinders 71 extended and the other cylinders 69 and 73 extended a third vertical height is achieved. Again by way of example, with two of the cylinders 69 and 71 extended and the other cylinder 73 retracted a fourth vertical height is achieved, and so on so that a variety of heights are achieved. By selectively fully retracting or extending the cylinders, the need for incremental movement is avoided, this minimizing the risk of inaccurate height placement.

Figure 5:
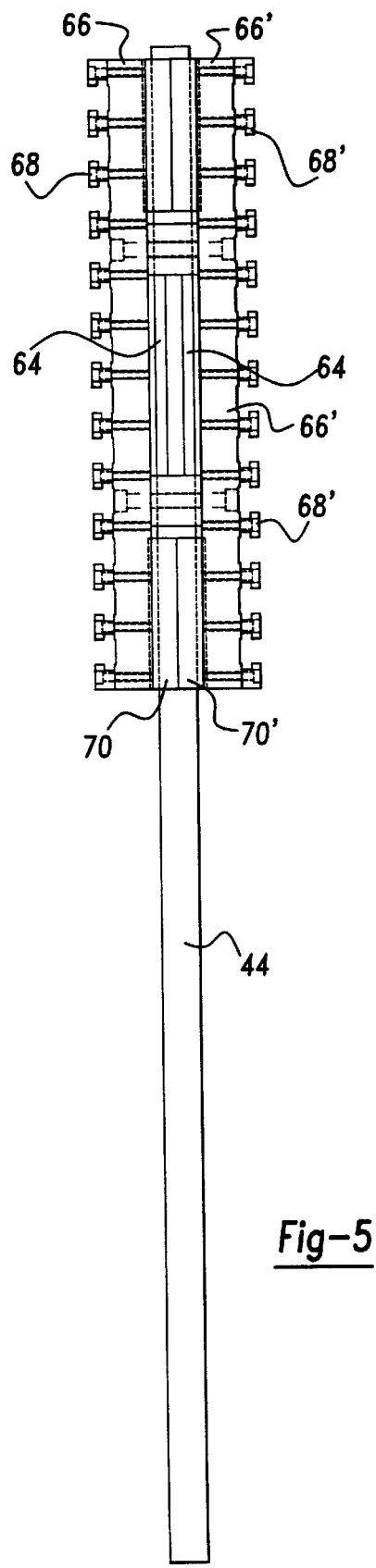
FIG. 5 is a side elevational view of a pair of opposed elevator plates mounted on an elevator slide.

FIG. 5 is a side elevational view of a pair of opposed elevator plates 66 and 66' mounted on the elevator slide 44. The spacing of the brackets 68 is illustrated in this view. It should be noted, however, that the number of brackets 68 and hence the possible number of held pin bars may be varied according to need. The fluid lines 64 are also visible positioned against the back walls of the plates 66 and 66'.

A pair of sleeves composed of two halves 70 and 70' are provided for slidably mounting the plates 66 and 66' to the slide 44. The half 70 is mounted to the back wall of the plate 66 and the half 70' is mounted to the back wall of the plate 66'. Each pin bar rack includes a base plate 66. Fixed to the base plate 66 is a plurality of spaced apart pin bar brackets 68.

Figure 6:
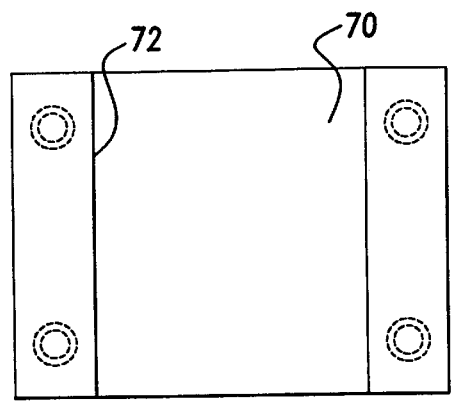
FIG. 6 is a front view of a supporting sleeve to which the elevator plate is attached so as to support the plate on the elevator slide.
Figure 7:
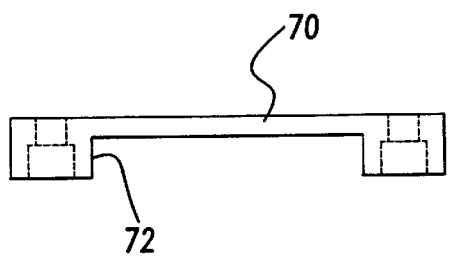
FIG. 7 is a sectional view of the supporting sleeve of FIG. 6.

FIG. 6 is a front view of the supporting sleeve 70. The sleeve 70 includes a slide-receiving channel 72 formed therein. FIG. 7 is a sectional view of the supporting sleeve 70 and more clearly illustrates the slide-receiving channel 72.

Figure 8:
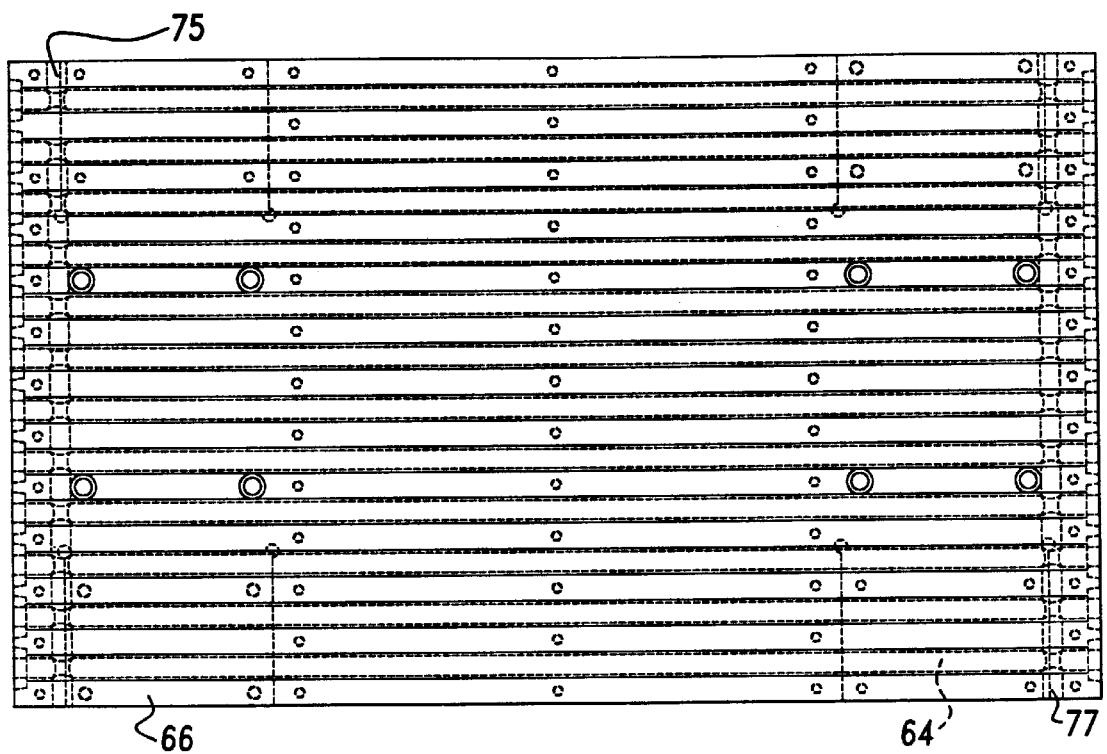
FIG. 8 is a front elevational view of a pin bar holder base plate according to the present invention.

FIG. 8 is a front elevational view of the pin bar base plate 66 without the brackets 68. As noted above, the elevator assembly 12 includes an internal heating system for preheating each of the pin bars prior to delivery to the lubricator 14 and subsequent delivery to the dipper assembly 16. The heating system comprises a series of fluid lines 64 shown in broken lines which are positioned operatively with respect to the pin bar rack 40. Hot water or oil is caused to flow through the lines 64. The fluid lines 64 include an inlet 75 and an outlet 77. By forming fluid lines 64 in the base plate 66, heat energy is transferred from the hot fluid through the fluid lines 64, through the base plate 66, and to the retained pin bars (not shown).

Figure 9:
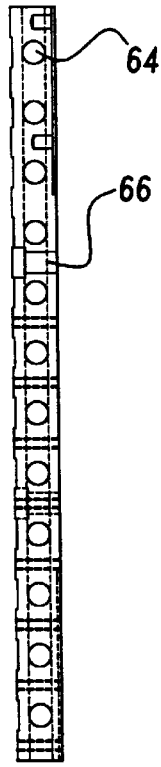
FIG. 9 is a side elevational view of the pin bar holder base plate of FIG. 8.
Figure 10:
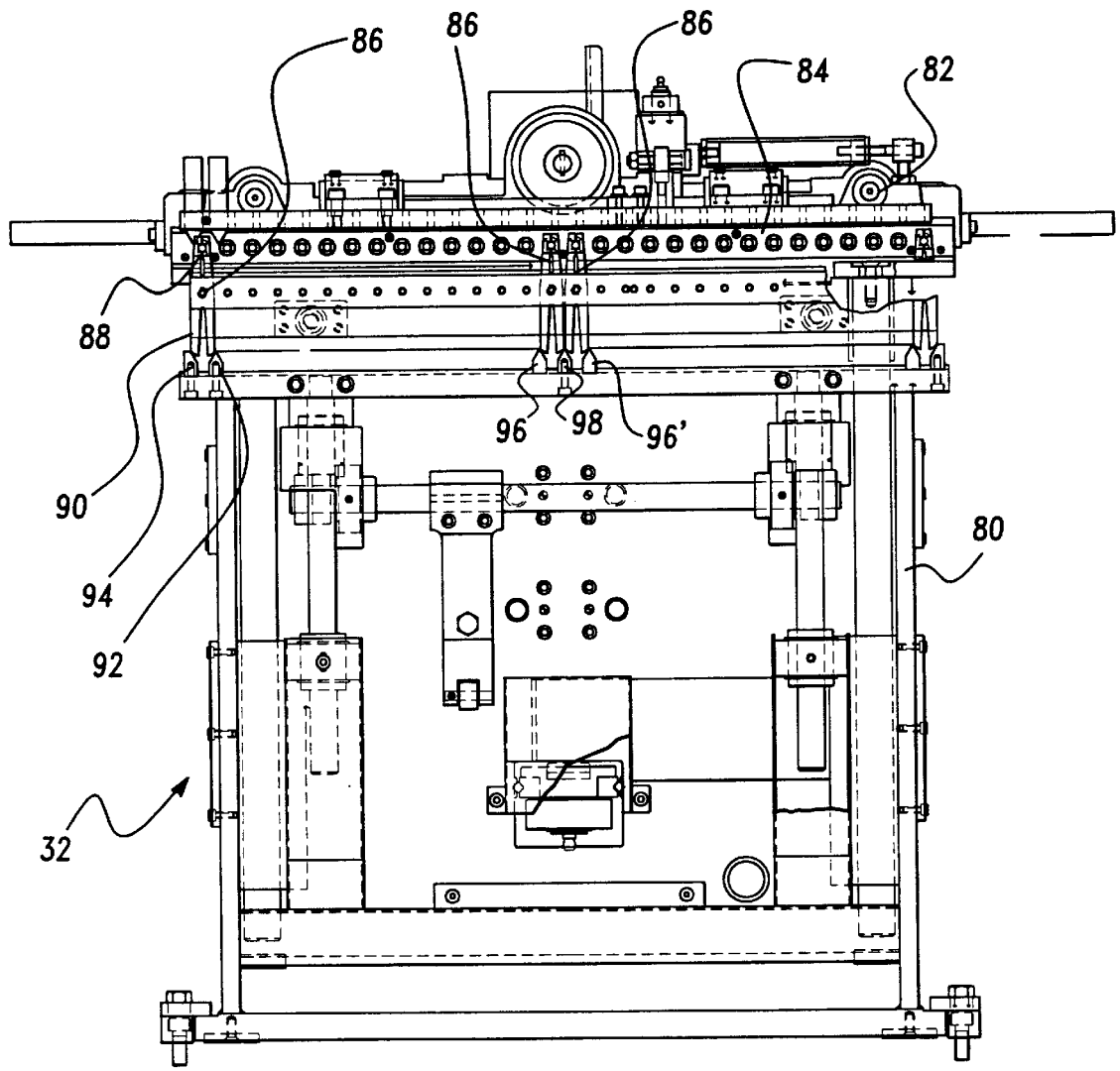
FIG. 10 is front view of the automatics of the present invention.

FIG. 9 is a side elevational view of the pin bar holder base plate 66. The brackets 68 are fastened to the front side of the base plate 66 using conventional fasteners. The ends of the horizontal fluid lines 64 (the ends of which are blocked after the lines are formed) are readily visible.

Capsule stripping, cutting, joining, and discharging are all performed by the automatics assembly 32. U.S. Pat. No. 1,787,777, issued on Jan. 6, 1931, to Colton for CAPSULE MACHINE, previously mentioned and previously incorporated by reference, extensively describes the automatics assembly. After being dried by the upper radiant panels 22 and the lower radiant panels 28, the caps and bodies are stripped from the pins on which they were formed, cut to the required length and assembled into empty capsules. The resulting capsules are discharged from the automatics assembly 32 by a conveyor (not shown) into a collecting drum.

FIGS. 10 through 14 illustrate various views of the automatics assembly 32. With respect to FIG. 10, a front view of the assembly 32 is shown. The assembly 32 includes a housing 80 and a conveyor assembly 82 for conveying a coated pin bar 84 into and through the assembly 32. Removal of the bodies or caps is accomplished by a series of "clothespin" style clips 86 which spring open at their upper ends to selectively and carefully grasp each of the dried bodies and caps. The upper ends 88 of the clips 36 are opened in response to closure of their lower ends 90 by the action of a movable pin 92 toward a fixed pin 94 and movable pins 96 and 96' toward a fixed pin 98.

Following removal of the bodies and caps from the individual pins of the pin bars, each portion is placed on a stud to provide internal support and is trimmed to remove excess coating. Thereafter, a body is joined to a cap to form a completed capsule, and the capsule is discharged from the assembly 32.

Figure 11:
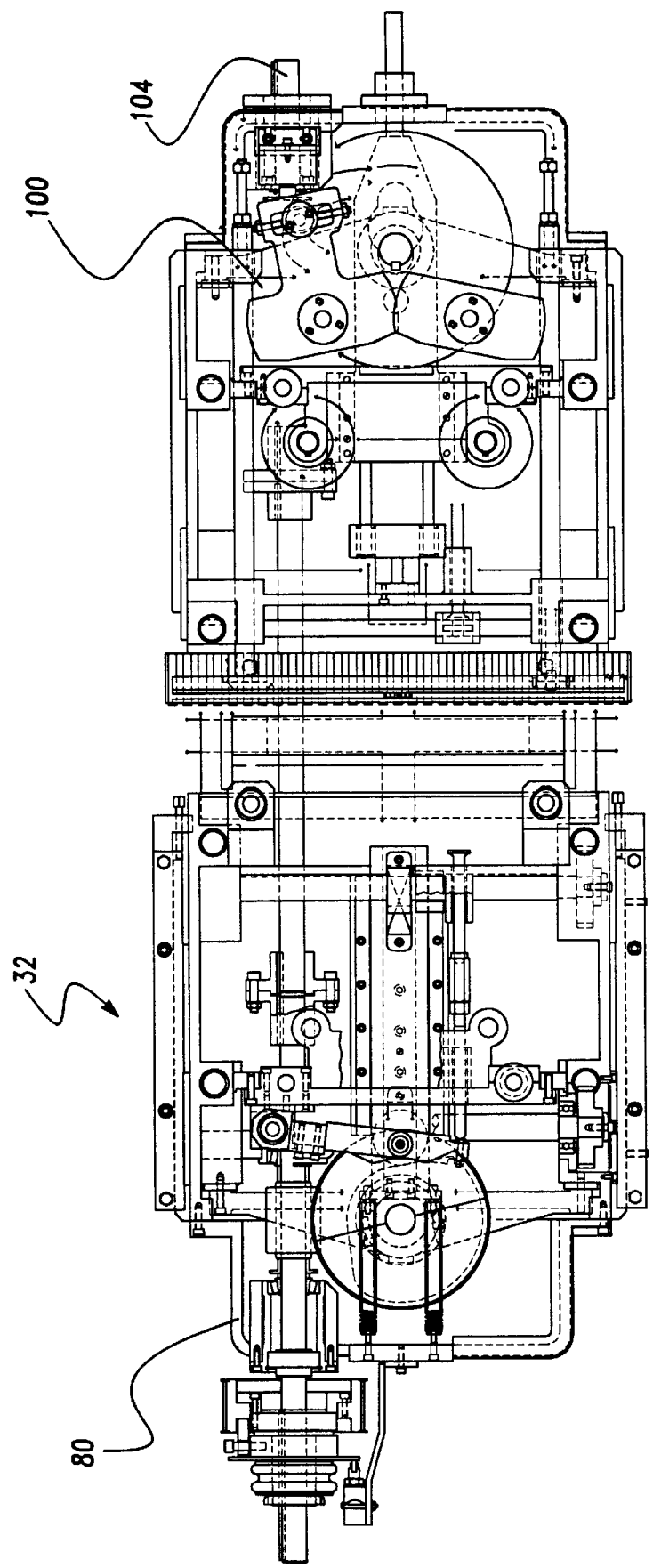
FIG. 11 is a top view of the automatics of the present invention.
Figure 12:
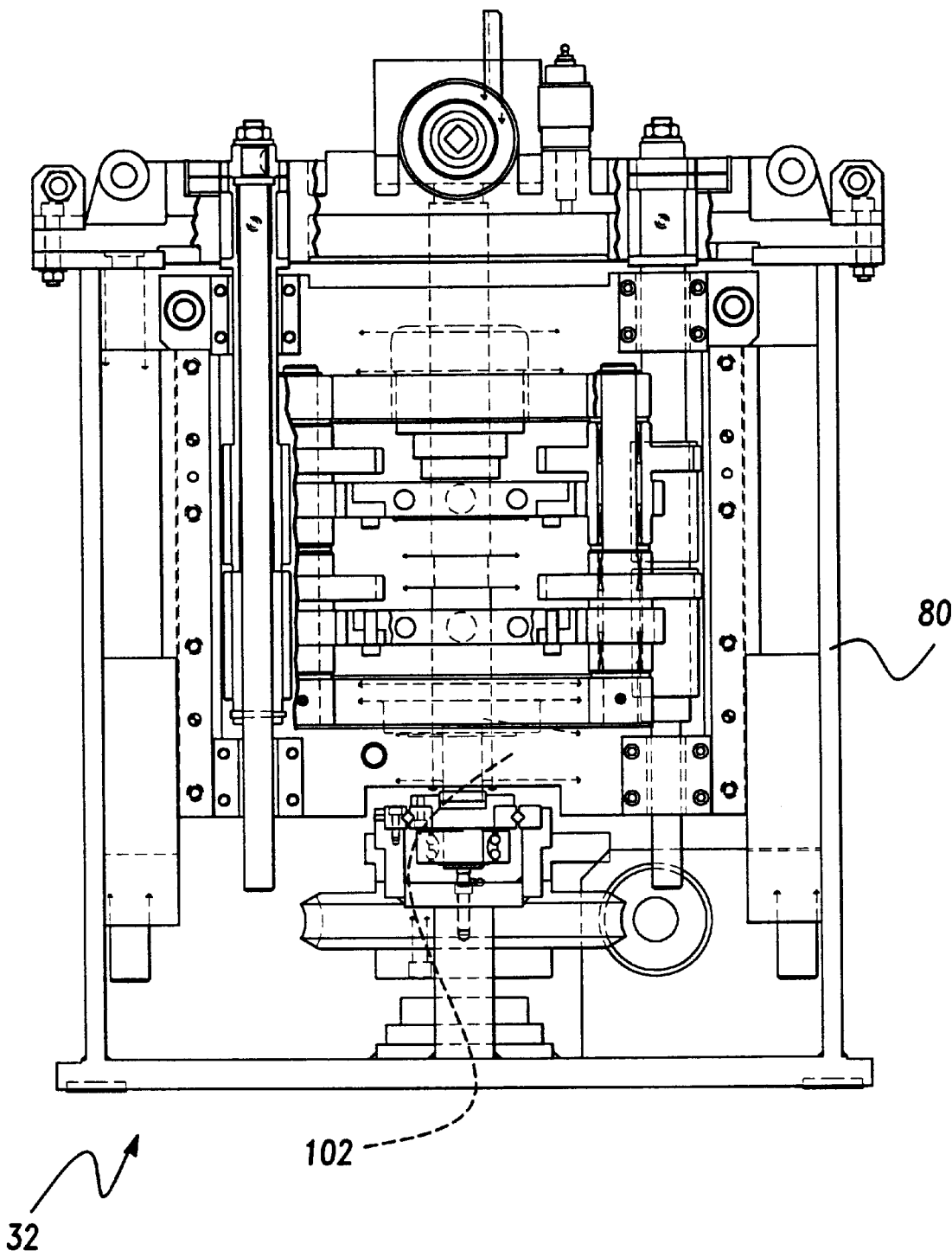
FIG. 12 is an end view (in cross section) of the automatics of the present invention.
Figures 13, 14:
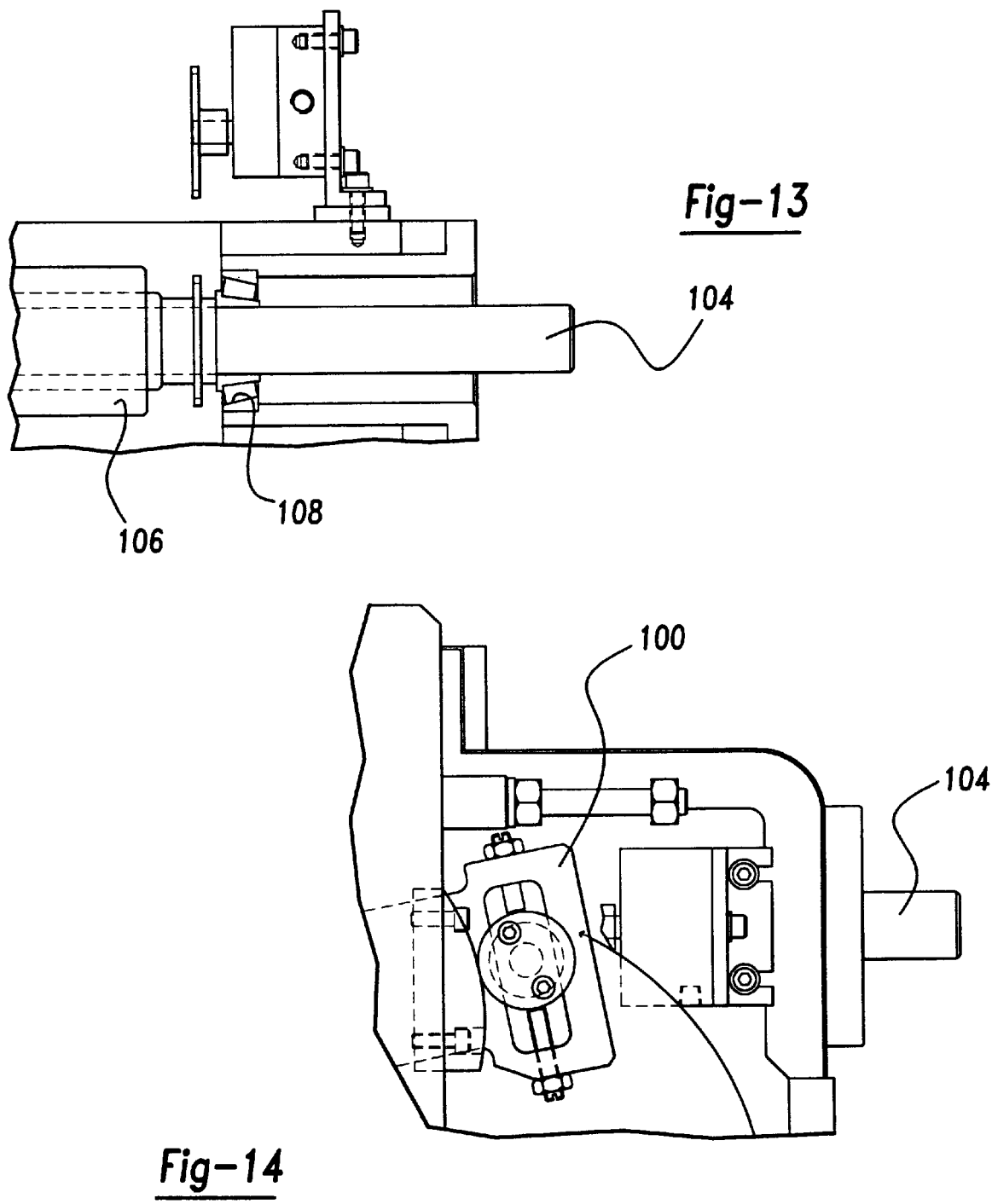
FIG. 13 is a close-up view of the main shaft with the worm gear and associated bearings of the automatics of the present invention.
FIG. 14 is a close-up top view of the stripper gear drive of the automatics of the present invention.

Referring to FIG. 11, a top view of the automatics assembly 32 of the present invention can be observed. The assembly 32 includes a stripper gear drive, generally illustrated as 100, for driving the clips 36. FIG. 12 shows an end view (in cross section) of the automatics assembly 32 according to the present invention. A drive assembly 102 is shown in broken lines. FIG. 13 is a close-up view of a main shaft 104 and its associated worm gear 106 and associated bearings 108 of the automatics assembly 32. A close-up top view of the stripper gear drive 100 of the automatics assembly 32 is disclosed in FIG. 14.

Figure 15:
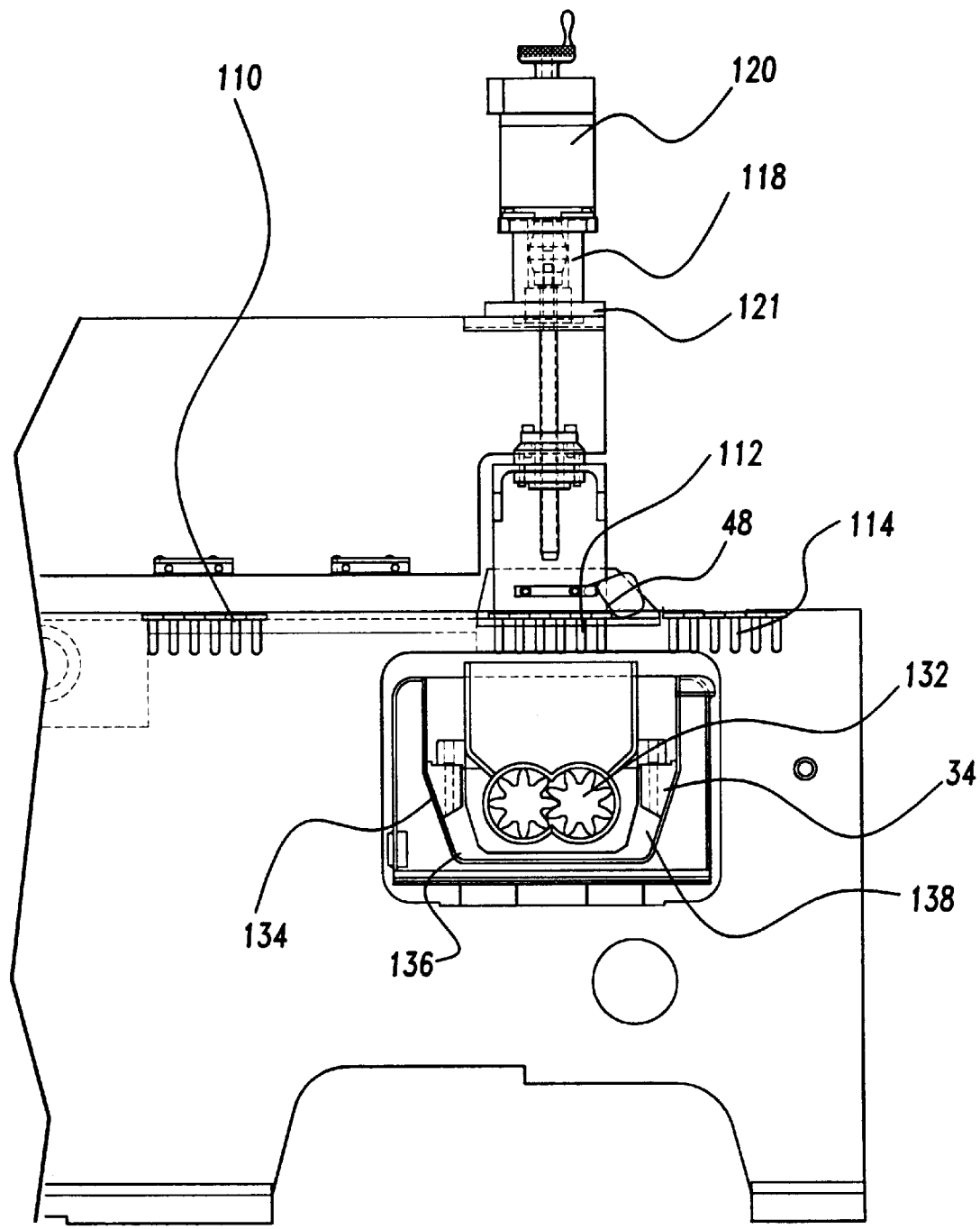
FIG. 15 is a sectional side view of the dipper assembly according to the present invention.
Figure 16:
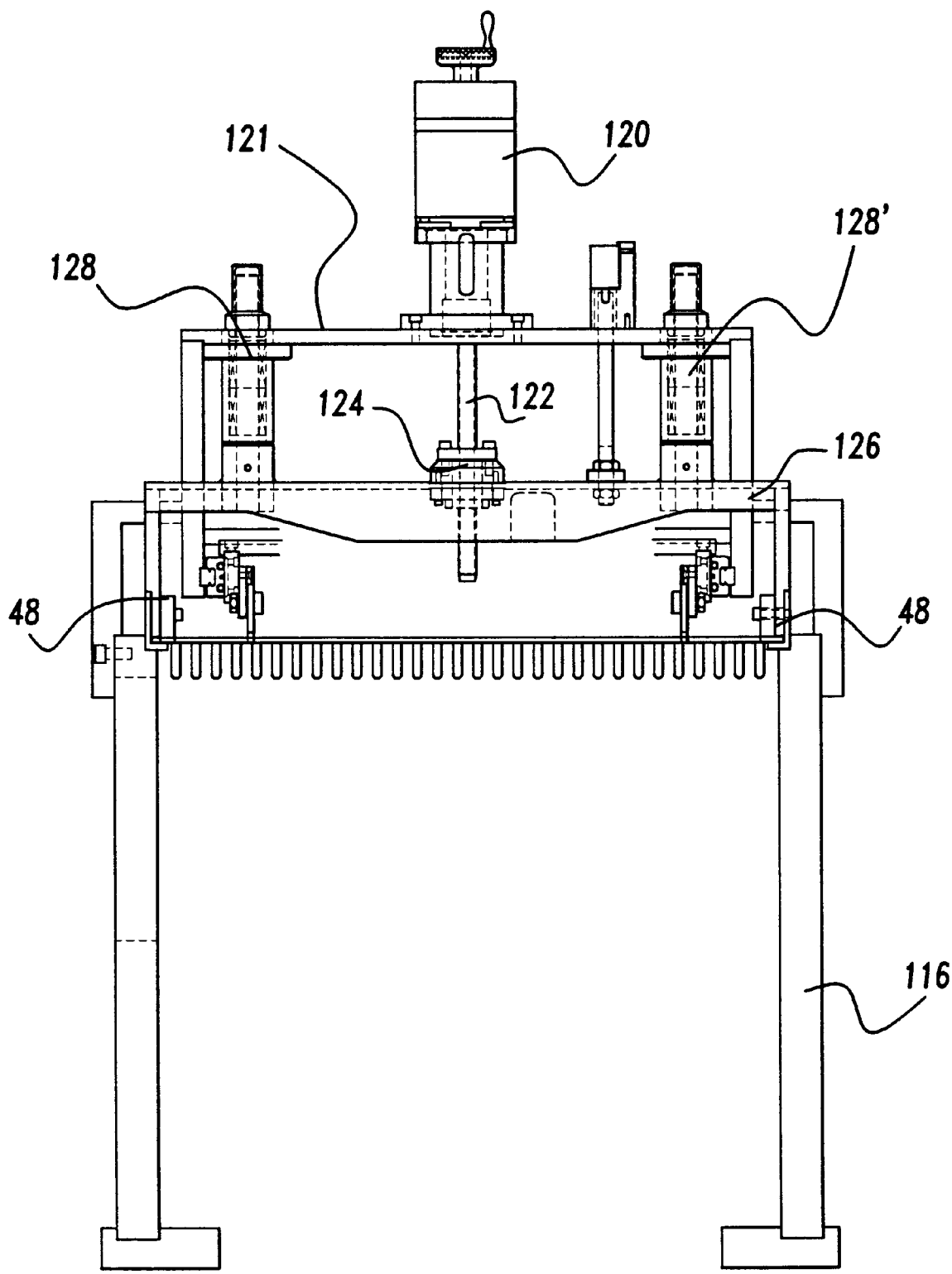
FIG. 16 is a front view of the dipper assembly according to the present invention.

The dipper assembly 16 is illustrated in FIGS. 15 and 16. In FIG. 15, a first set of pin bars 110 are shown in end view, as is a second set of pin bars 112 and a third set of pin bars 114. Each set 110, 112, 114 is shown in progressive movement through the dipper assembly 16.

With reference to both FIGS. 15 and 16, the dipper assembly 16 includes a housing 116 and an associated dipper unit 118. A stepper motor 120 is provided to selectively manipulate each of the sets of pin bars 110, 112, 114. The motor 120 is mounted on a fixed support 121 and includes a worm gear 122 which is mated with a threaded fitting 124 fixed to a pin bar support bracket 126. On operation, the rotational movement of the worm gear 122 translates into upward or downward movement of the pin bar support 126. A pair of spaced apart alignment supports 128 and 128' are provided to movably and slidably connect the pin bar support 126 to the fixed support 121.

The dipping tank 34 includes an agitator 132 submerged within the capsule-forming composition. The tank 34 includes an inner wall 134 which holds the composition and an outer wall 136. Between the inner wall 134 and the outer wall 136 is provided a heating system 138 which allows a heating fluid (such as hot water or oil) to circulate around the inner wall 134, thereby maintaining the composition in a desired flowable state.

As illustrated, the first set of pin bars 110 has been assembled and is prepared, pins facing downward, on the dipper racks 48 for dipping in the tank 34. The second set of pin bars 112 is in position—directly above the dipping tank 34—for dipping. The third set of pin bars 114 has already been coated and is on its way to the front elevator 18 for movement to the upper deck 20 and subsequent drying and capsule portion removal.

As mentioned above particularly with respect to FIGS. 8 and 9, each of the elevator plates 66 and 66' is provided with a series of fluid lines 64 for heating the plates, the heat of which is thereafter transferred to the individual pin bars. This system is highly effective for the heating of the pin bar bases, particularly from the back side. However, the heating system of the present invention also provides a method of delivering heat directly to the pins themselves and to the front sides of the pin bar bases. This system of external heating is a preferred option and is set forth in FIGS. 17 through 19.

Figure 17:
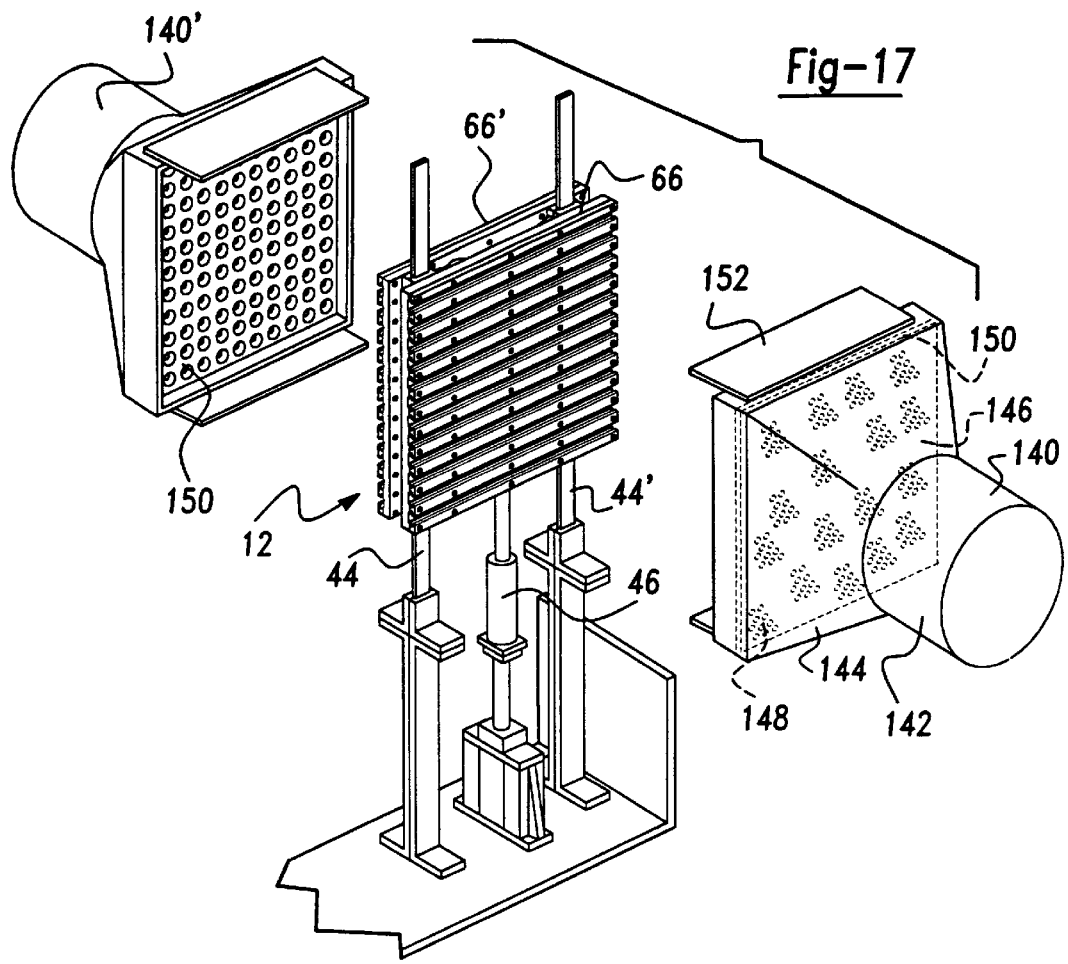
FIG. 17 is an exploded view showing a single pin bar rack and a pair of accompanying external heater assemblies.

Referring first to FIG. 17, a perspective view of an elevator assembly 12 is shown with a pair of external heating assemblies 140 and 140' shown in spaced apart relation thereto. When assembled, the external heating assembly 140 is preferably mounted on and moves vertically with the plate 66, while the external heating assembly 140' is likewise preferably mounted on and moves vertically with the plate 66'.

Taking the heating assembly 140 as an example with the other heating assembly 140' being identical, the assembly 140 includes a heater 142 which is connected to a source of pressurized air (see FIG. 19), a plenum 144, a perforated plate 146 having a plurality of holes 148 formed therein, and an air distribution plate 150 (best shown on the heating assembly 140'). Mounting plates 152 are provided on the sides of the plenum 144 as one method of attaching the heating assembly 140 to the plate 66, although other methods may as well be employed.

Figure 18A:
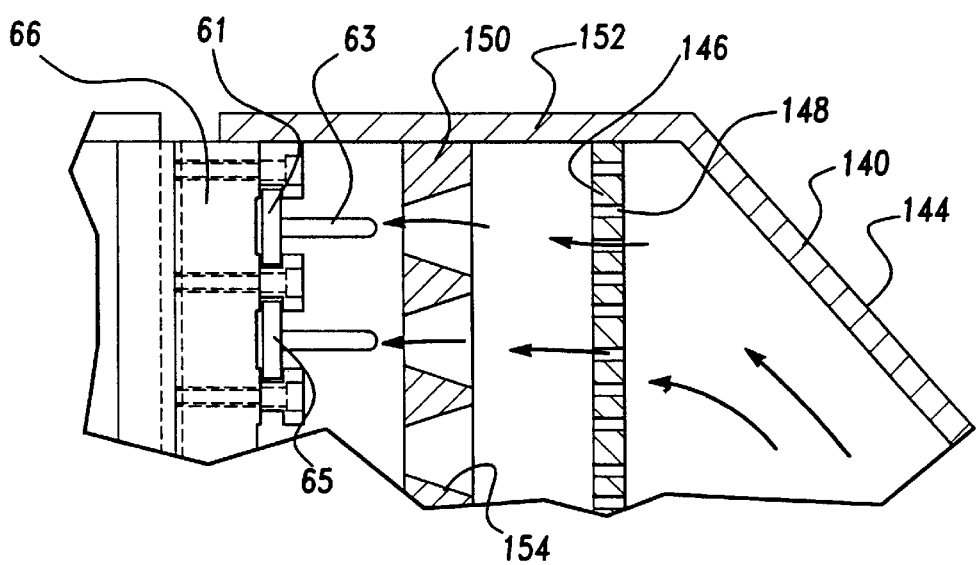
FIG. 18a is a sectional view of a first preferred arrangement of a pin bar rack, a pair of pin bars, and an external pin bar heating shroud.

As noted above, the heating assembly 140 is used to provide external heat to the pin bars. FIG. 18a illustrates a cross-sectional view of a portion of the plate-heating assembly according to the present invention. As illustrated by the arrows, hot air is caused to flow into the plenum 144 and passes through the holes 148 formed in the perforated plate 146. The air thereafter passes through a plurality of conical openings 154 formed through the distribution plate. The conical configuration of each of the openings 154 focuses and directs hot air directly to the pin 63, thus compensating for the fact that this portion is the coolest of the pin bar given that the internal heat provided by the fluid lines 64 deliver heat most directly to the pin bar base 65. This arrangement provides for an optimum system for uniformly heating the whole pin bar 61.

Figure 18B:
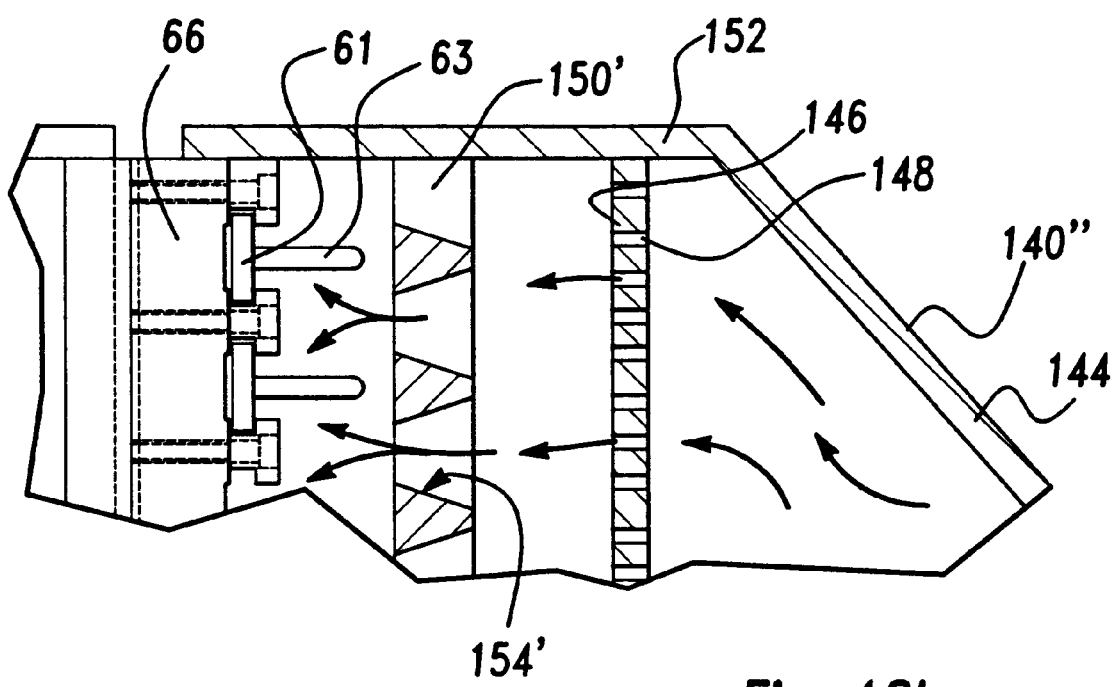
FIG. 18b is a sectional view of a second preferred arrangement of a pin bar rack, a pair of pin bars, and an external pin bar heating shroud.

It may be desired that the hot air be focused to the front of the pin bar base 65 and not to the pin 63 itself. In this event, an arrangement such as that shown in FIG. 18b is provided. According to this construction, an external heating assembly 140" includes elements which are substantially the same as the assembly 140 shown and discussed with respect to FIG. 18a, but includes an air distribution plate 150' which has a plurality of conical openings 154' which are offset compared to the openings 154 of FIG. 18a whereby hot air illustrated by the arrows is directed to the pin bar bases 65 primarily and secondarily is delivered to the pins 63 themselves.

Figure 19:
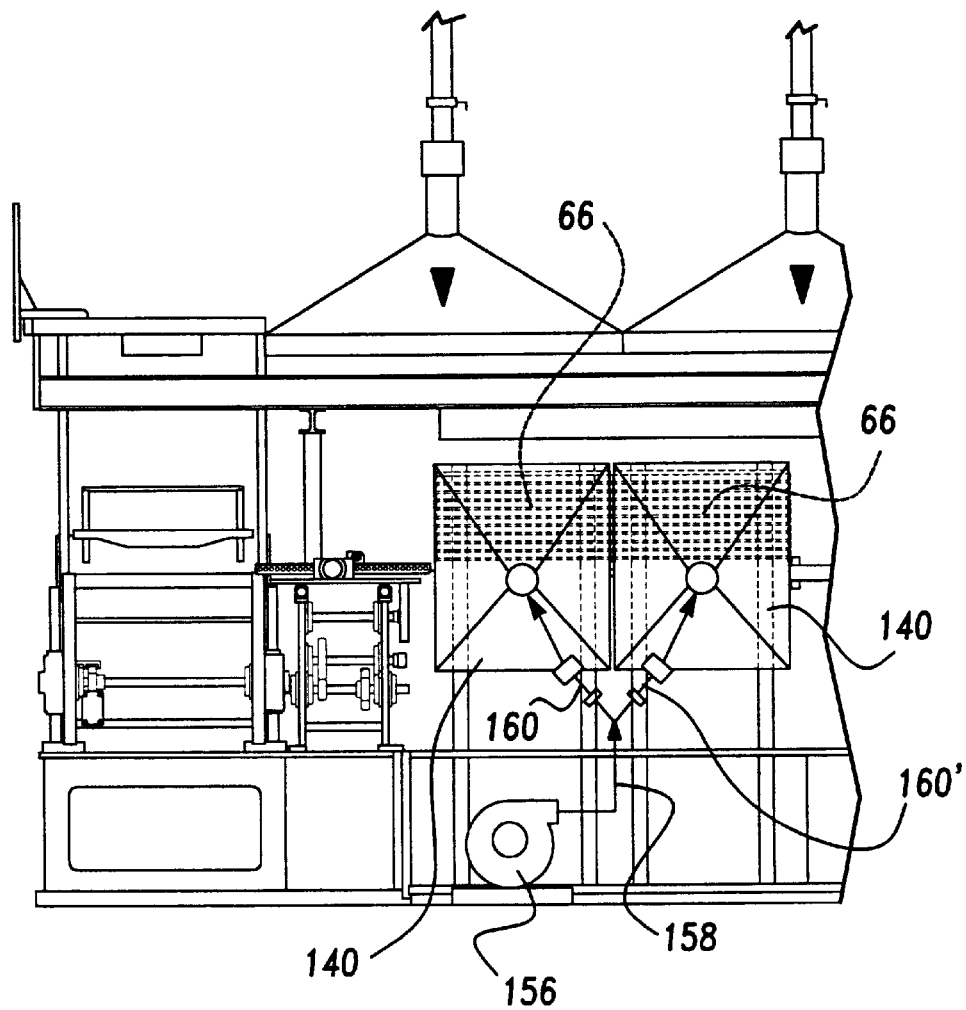
FIG. 19 is a side elevational view of a portion of a the capsule-making system of the present invention illustrating the external heating system in place that is shown in FIGS. 17, 18a and 18b.

FIG. 19 illustrates an elevated side view of an arrangement of a pair of side-by-side mounted external heating assemblies 140 mounted on a pair of side-by-side racks 66. A blower unit 156 such as a 5000 cfm unit is mounted and, through a primary air duct 158 and a pair of secondary air ducts 160 and 160', delivers air to the assemblies 140. The air pressure of the blower unit 156 may be controlled by a variable flow controller (not shown) associated with the blower unit 156.

As may be understood by the foregoing, the present invention allows for the efficient manufacture of pharmaceutical capsules. Particularly by the provision of the heated elevator assembly, the pin bars demonstrate more even temperatures with respect to one another, thus providing optimum opportunity for even coating. This provides significant advantages over known capsule manufacturing systems.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A pin bar heater elevator assembly for use with a capsule making machine, the assembly comprising:
   a pin bar rack including brackets for simultaneously supporting at least two empty pin bars;
   a pin bar elevator in operative association with said pin bar rack, said pin bar elevator including means for moving said pin bar rack between a first position and a second position; and
   means for heating said empty pin bars supported by said brackets.

2. The pin bar elevator assembly of claim 1, wherein said means for heating is associated with said pin bar rack.

3. The pin bar elevator assembly of claim 2, wherein said means for heating includes a fluid line for circulating heated fluid therethrough.

4. The pin bar elevator assembly of claim 1, wherein said means for heating includes a fluid line operatively associated with said pin bar rack for circulating heated fluid therewith.

5. The pin bar elevator assembly of claim 1, wherein said pin bar rack includes a base plate to which said brackets are fixedly attached, at least one of the pin bars being slidably positionable between two adjacent brackets.

6. The pin bar elevator assembly of claim 5, wherein said pin bar elevator includes at least one slide, said base plate being slidably attached to said at least one slide.

7. The pin bar elevator assembly of claim 6, wherein said at least one slide defines two spaced apart slides.

8. The pin bar elevator assembly of claim 7, wherein said pin bar elevator further includes slide bases upon which each of said two spaced apart slides are mounted.

9. The pin bar elevator assembly of claim 6, further including a sleeve fitted between said at least one slide and said base plate, said sleeve being fixedly mounted to said base plate.

10. The pin bar elevator assembly of claim 9, wherein said sleeve has a slide-passing channel formed therethrough.

11. The pin bar elevator assembly of claim 1, further including a driver operatively associated with said pin bar rack for selective movement thereof.

12. The pin bar elevator assembly of claim 11, wherein said driver is hydraulically operated.

13. The pin bar elevator assembly of claim 11, wherein said driver is defined by a hydraulic cylinder.

14. The pin bar elevator assembly of claim 13, wherein said hydraulic cylinder includes a plurality of hydraulic cylinders, each of said plurality of hydraulic cylinders having a stroke length, the stroke lengths of at least two of said plurality of hydraulic cylinders being different.

15. The pin bar elevator assembly of claim 5, wherein said means for heating defines a heating element fitted to said base plate.

16. The pin bar elevator assembly of claim 15, wherein said heating element is a fluid line for conveying heated fluid therethrough.

17. The pin bar elevator assembly of claim 16, wherein said heated fluid is oil.

18. The pin bar elevator assembly of claim 11, further including a computer associated with said driver for effecting selective movement of said pin bar rack.

19. The pin bar elevator assembly of claim 1, further including means for externally heating said pin bars.

20. The pin bar elevator assembly of claim 19, wherein said means for externally heating includes an external heating assembly having an air distribution plate.

21. The pin bar elevator assembly of claim 20, wherein said air distribution plate has a plurality of conical openings formed therein for directing air to said pin bars.

22. The pin bar elevator assembly of claim 21, wherein said pin bars include a plurality of pins and wherein said conical openings are arranged to direct heat to said pins of the pin bars.

23. The pin bar elevator assembly of claim 22, wherein each of said pin bars includes a pin bar base and wherein said conical openings are arranged to direct heat to said pin bar base.

24. The pin bar elevator assembly of claim 20, wherein said external heating assembly further includes a heater element and a shroud connecting said heater element and said distribution plate.

25. The pin bar elevator assembly of claim 24, wherein said external heating assembly further includes a perforated plate disposed between said heater element and said distribution plate.

26. The pin bar elevator assembly of claim 24, wherein said external heating assembly further includes a blower and an air duct connecting said blower and said heater element.

27. A pin bar heater elevator assembly for a capsule making machine, the machine including a pin bar pusher for pushing an empty pin bar and a dipping assembly for receiving a pin bar and for dipping the received pin bar into a capsule-forming composition, the elevator assembly comprising:
   a pin bar elevator; and
   a pin bar rack in operative association with said pin bar elevator, said pin bar rack being selectively movable by said pin bar elevator between a first position and a second position,
   whereby said pin bar rack is operatively associated with the pin bar pusher and the dipping assembly such that the pin bar pusher can push an empty pin bar into the pin bar rack and can thereafter push an empty pin bar toward the dipping assembly.

28. The elevator assembly of claim 27, further including means for heating the pin bar.

29. The elevator assembly of claim 28, wherein said means for heating includes a fluid line operatively associated with said pin bar rack.

30. The elevator assembly of claim 27, wherein said pin bar elevator includes at least one slide upon which said pin bar rack selectively moves.

31. The elevator assembly of claim 30, wherein said pin bar elevator further includes a driver for selectively positioning said pin bar rack on said at least one slide.

32. The elevator assembly of claim 30, wherein said pin bar rack includes a base plate and a plurality of pin bar-holding racks fixed to said base plate.

33. The elevator assembly of claim 32, further including a sleeve fitted between said base plate and said slide, said sleeve being fixed to said base plate.

34. The elevator assembly of claim 27, including a computer for selectively effecting movement of said pin bar rack.

35. A capsule making machine comprising an elevator assembly for receiving at least two pin bars, said elevator assembly movable in a linear direction with periodic hesitations for receiving and expelling said pin bars, said elevator assembly simultaneously altering a temperature of said pin bars.

36. The machine of claim 35 comprising:
   a dipper assembly including a quantity of a capsule-forming composition, a spinner of said dipper assembly receiving and dipping at least a portion of the empty pin bar to form a capsule portion; and
   an automatics assembly for removing said capsule portions from said pin bars and for trimming said capsule portions.

37. The machine of claim 36 comprising:
   a kiln drying said capsule portion formed on said at least partially dipped pin bar; and
   a rear elevator vertically moving said pin bars from said kiln disposed in an upper deck to a lower deck;
   said spinner vertically moving said pin bars from said lower deck to said upper deck.

38. The machine of claim 36 wherein said automatics assembly includes means for assembling two of said capsule portions to form a whole capsule shell.

39. The machine of claim 35 further comprising a portion of an air heat transfer system moveable with said elevator assembly for heating said pin bars while moving with said elevator assembly.

40. The machine of claim 35 further comprising a liquid heat transfer system moveable with said elevator assembly for heating said pin bars while moving with said elevator assembly.

41. The machine of claim 40 further comprising a portion of an air heat transfer system moveable with said elevator assembly for heating said pin bars while moving with said elevator assembly.

42. The machine of claim 35 further comprising at least twelve of said pin bars being simultaneously retained to said elevator assembly.

43. The machine of claim 35 further comprising each of a set of brackets having a first leg extending from a substantially first planar face of said elevator assembly in a substantially perpendicular manner, a second leg of each of said brackets extending from a distal end of said first leg in a substantially perpendicular manner, said set of brackets retaining body forms of said pin bars.

44. The machine of claim 43 further comprising a second set of brackets depending from a second substantially planar face of said elevator assembly for retaining cap forms of said pin bars.

45. The machine of claim 35 wherein said elevator moves in a vertical direction by fluid actuated pistons.

46. An apparatus comprising:
   a set of medicinal capsule forming members;
   a rack operably receiving said members, said members entering said rack in a first direction;
   a heating device operably heating said rack; and
   an actuation mechanism operably moving said rack in a second direction offset from said first direction.

47. The apparatus of claim 46 wherein said second direction is substantial vertical.

48. The apparatus of claim 47 wherein said first direction is substantially horizontal, each of said members enter said rack one at a time.

49. The apparatus of claim 46 wherein at least a portion of said heating device moves with said rack.

50. The apparatus of claim 49 wherein said heating device includes a blower.

51. The apparatus of claim 46 wherein said members include elongated bars with projecting pins.

52. The apparatus of claim 46 further comprising:
   a dipper station having a capsule-forming liquid; and a drying station operably drying said liquid on said members.

53. The apparatus of claim 46 further comprising:

a second rack operably moving in concert with said first rack;

a second set of members operably received by said second rack; and a second heating device providing hot air to said second set of members.

54. The apparatus of claim 46 further comprising pins of said members substantially projecting horizontal from said rack for exposure to said heating device.

* * * * *

UNITED STATES PATENT AND TRADEMARK OFFICE
CERTIFICATE OF CORRECTION

PATENT NO. : 5,945,136
DATED : August 31, 1999
INVENTOR(S) : Victorov et al.

It is certified that error appears in the above-identified patent and that said Letters Patent is hereby corrected as shown below:

Title Page - Abstract, line 9 - delete "is" (second occurrence).

Column 4, line 42, after "is" insert --a--.

Column 4, line 66, delete "a".

Column 5, line 37, "capsules" should be --capsule--.

Column 8, line 14, "Fig. 2" should be --Fig. 2a--.

Column 11, line 43, " 140" " should be --140'--.

Column 14, line 56, claim 47, "substantial" should be --substantially--.

Signed and Sealed this

Ninth Day of May, 2000

Attest:

Q. TODD DICKINSON

*Attesting Officer*          *Director of Patents and Trademarks*